United States Patent
Kuo

(10) Patent No.: US 10,477,554 B2
(45) Date of Patent: *Nov. 12, 2019

(54) METHOD AND APPARATUS FOR BEAM DETECTION IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 1 day.

This patent is subject to a terminal disclaimer.

(21) Appl. No.: 15/858,926

(22) Filed: Dec. 29, 2017

(65) Prior Publication Data

US 2018/0146468 A1 May 24, 2018

Related U.S. Application Data

(62) Division of application No. 15/004,370, filed on Jan. 22, 2016.

(60) Provisional application No. 62/166,368, filed on May 26, 2015, provisional application No. 62/107,792, filed on Jan. 26, 2015, provisional application No. 62/107,814, filed on Jan. 26, 2015.

(51) Int. Cl.
| | |
|---|---|
| *H04B 7/06* | (2006.01) |
| *H04W 72/04* | (2009.01) |
| *H04W 74/08* | (2009.01) |
| *H04W 74/00* | (2009.01) |
| *H04W 88/02* | (2009.01) |
| *H04W 88/08* | (2009.01) |

(52) U.S. Cl.
CPC ....... *H04W 72/046* (2013.01); *H04W 72/042* (2013.01); *H04W 74/0833* (2013.01); *H04W 74/006* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2012/0320874 A1* | 12/2012 | Li | H04W 48/12 370/331 |
| 2013/0337822 A1* | 12/2013 | Rubin | H04W 72/12 455/452.1 |
| 2014/0185481 A1* | 7/2014 | Seol | H04W 52/42 370/252 |

(Continued)

FOREIGN PATENT DOCUMENTS

WO 2014116928 7/2014

OTHER PUBLICATIONS

European Search Report from corresponding EP Application No. 18152087.5, dated Apr. 11, 2018.

*Primary Examiner* — Ayanah S George
(74) *Attorney, Agent, or Firm* — Blue Capital Law Firm, P.C.

(57) ABSTRACT

A method and apparatus for beam detection in a wireless communication system. In one embodiment, the method includes the UE initiating a RA procedure. The method also includes the UE transmitting multiple RA preambles to a base station of the cell at different occasions for the base station to determine a beam set of the UE. The method further includes the UE starts monitoring a PDCCH for RA response reception from the base station after finishing transmissions of the multiple RA preambles.

17 Claims, 26 Drawing Sheets

(56) References Cited

U.S. PATENT DOCUMENTS

2014/0254515 A1* 9/2014 Kim .................. H04W 74/0833
370/329

* cited by examiner

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 9 (PRIOR ART)

| Configuration | $N_{sc}^{RB}$ | $N_{symb}^{DL}$ |
|---|---|---|
| Normal cyclic prefix | $\Delta f = 15$ kHz | 12 | 7 |
| | $\Delta f = 15$ kHz | | 6 |
| Extended cyclic prefix | $\Delta f = 7.5$ kHz | 24 | 3 |

FIG. 11 (PRIOR ART)

METHOD AND APPARATUS FOR BEAM DETECTION IN A WIRELESS COMMUNICATION SYSTEM

CROSS-REFERENCE TO RELATED APPLICATIONS

This application is a Divisional of U.S. patent application Ser. No. 15/004,370, filed Jan. 22, 2016, which claims the benefit of U.S. Provisional Patent Application Ser. No. 62/107,792 filed on Jan. 26, 2015, U.S. Provisional Patent Application Ser. No. 62/107,814 filed on Jan. 26, 2015, and U.S. Provisional Patent Application Ser. No. 62/166,368 filed on May 26, 2015, the entire disclosures of which are incorporated herein in their entirety by reference.

FIELD

This disclosure generally relates to wireless communication networks, and more particularly, to a method and apparatus for beam detection in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

Furthermore, EU started the METIS project in November 2012 to lay the foundation of 5G, the next generation mobile and wireless communications system. The main technical objectives (or 5G requirements) include the following:
- 1000 times higher mobile data volume per area;
- 10 to 100 times higher number of connected devices;
- 10 to 100 times higher user data rate;
- 10 times longer battery life for low power massive machine communications (MMC); and
- 5 times reduced End-to-End latency (<5 ms).

It is clear the above requirements demand much higher system capacity than what can be offered by the legacy systems. Thus, a new radio access technology can be expected to fulfill these requirements.

SUMMARY

A method and apparatus for beam detection in a wireless communication system. In one embodiment, the method includes the UE initiating a random access (RA) procedure. The method also includes the UE transmitting multiple RA preambles to a base station of the cell at different occasions for the base station to determine a beam set of the UE. The method further includes the UE starts monitoring a Physical Downlink Control Channel (PDCCH) for RA response reception from the base station after finishing transmissions of the multiple RA preambles.

BRIEF DESCRIPTION OF THE DRAWINGS

FIG. 9 is a reproduction of Table 5.1-1 of 3GPP TS 36.300 V12.5.0.

FIG. 11 is a reproduction of Table 6.2.3-1 of 3GPP TS 36.211 V12.5.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support the wireless technology discussed in the various documents, including: "DOCOMO 5G White Paper" by NTT Docomo, Inc. Furthermore, the exemplary wireless communication systems devices described below may be designed to support one or more standards such as the standard offered by a consortium named "3rd Generation Partnership Project" referred to herein as 3GPP, including: R2-145410, "Introduction of Dual Connectivity", NTT Docomo, Inc., NEC; TS 36.321 V12.3.0, "E-UTRA MAC protocol specification"; TS 36.213 V12.3.0, "E-UTRA Physical layer procedures"; TS 36.300 V12.5.0, "E-UTRA and E-UTRAN Overall description"; TS 36.211 V12.5.0, "E-UTRA Physical channels and modulation"; and METIS Public Deliverable D2.4 "Proposed solutions for new radio access". The standards and documents listed above are hereby expressly incorporated by reference in their entirety.

Figure 1:
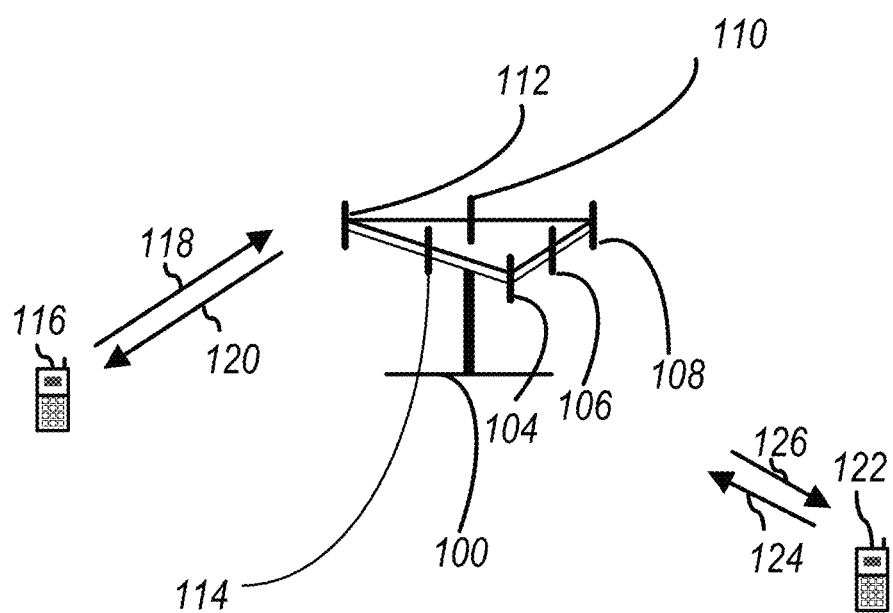
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
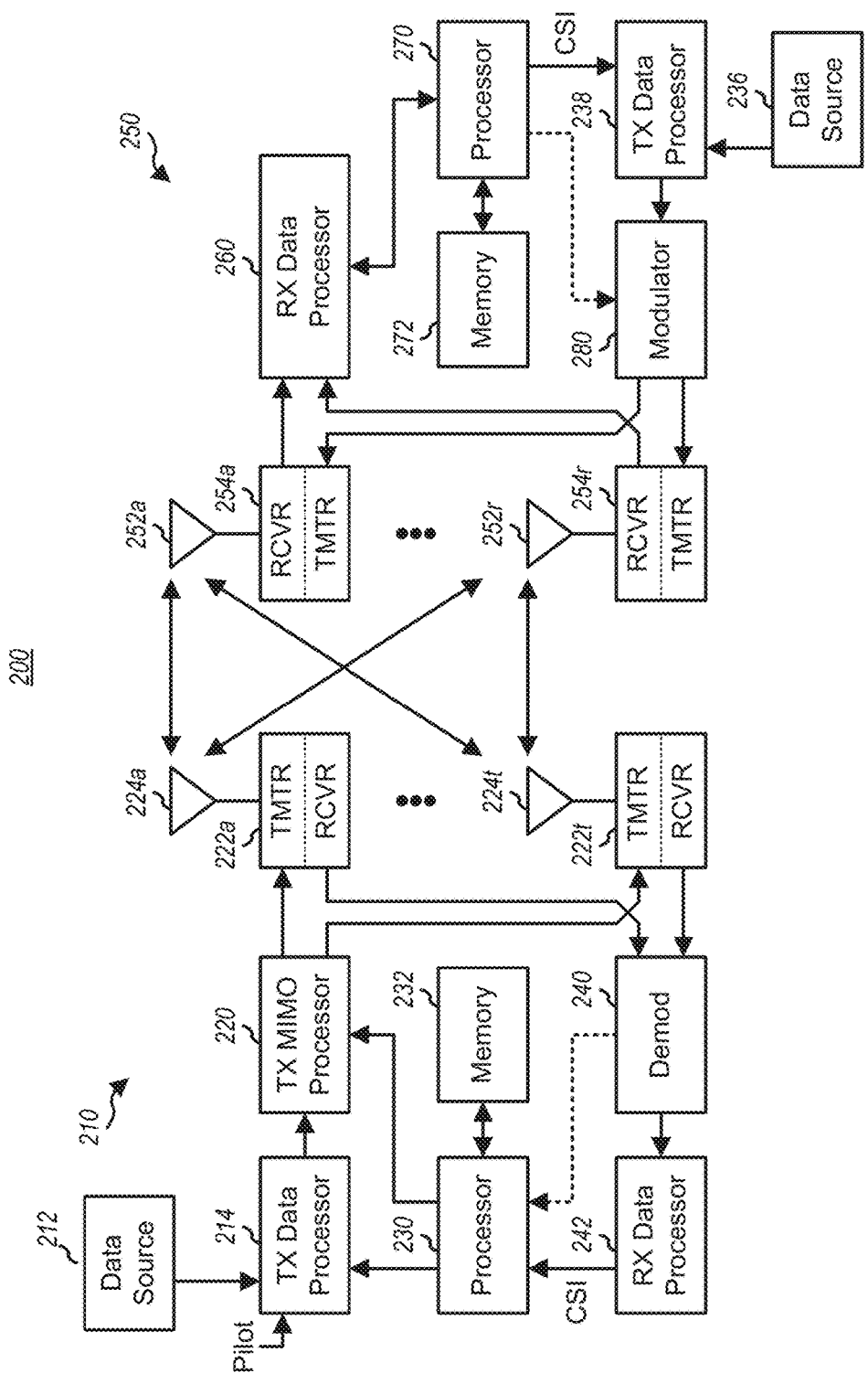
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
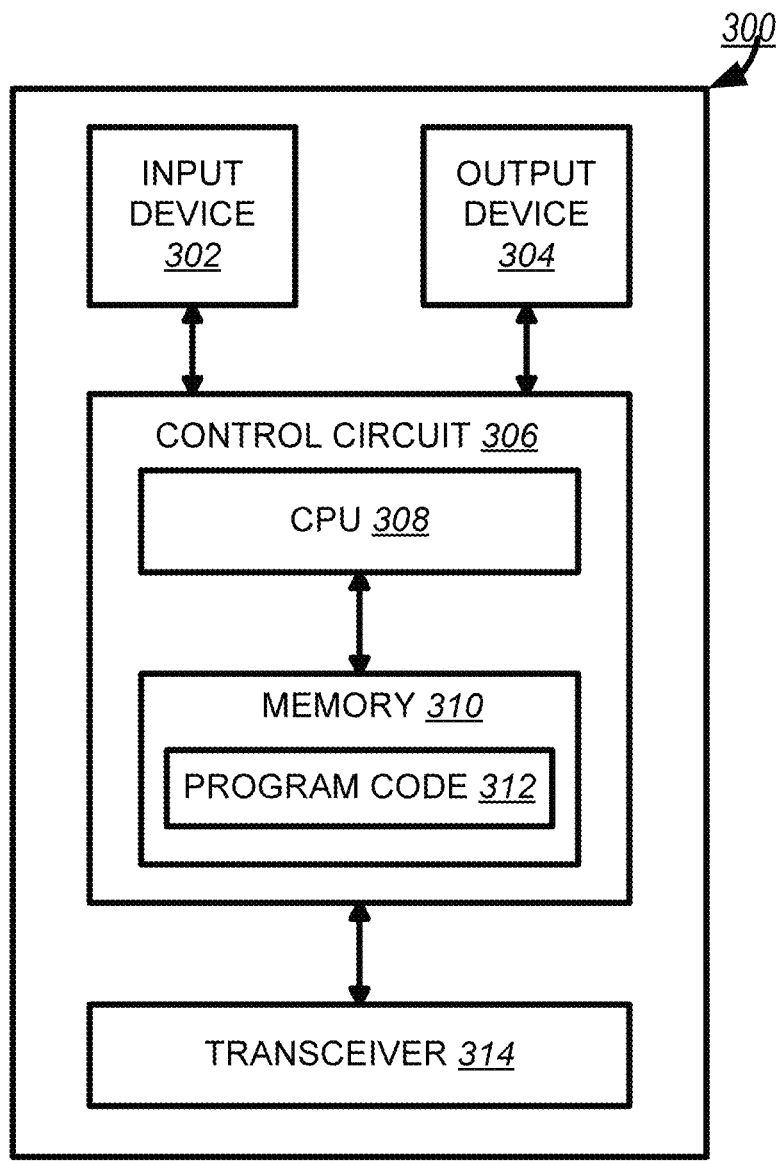
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
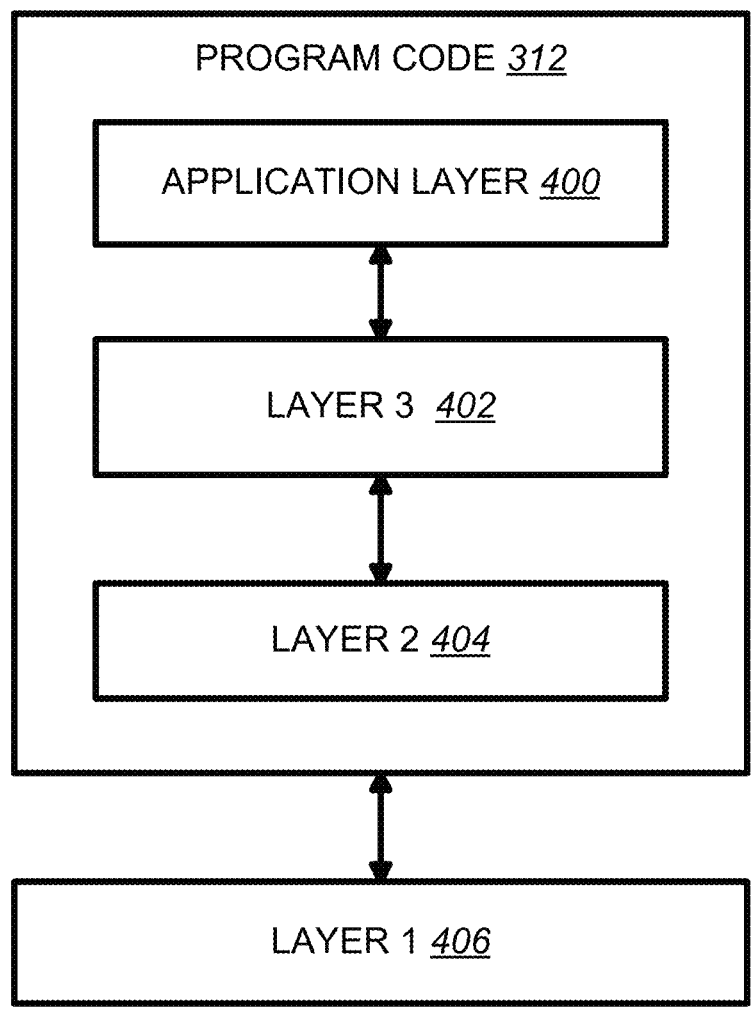
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The DOCOMO 5G White Paper introduces a 5G radio access concept that efficiently integrates both lower and higher frequency bands. Since higher frequency bands provide opportunities for wider spectrum but have coverage limitations because of higher path loss, it was proposed that a 5G system has a two-layer structure which consists of a coverage layer (e.g., consisting of macro cells) and a capacity layer (e.g., consisting of small cells or phantom cells). The coverage layer uses existing lower frequency bands to provide basic coverage and mobility. The capacity layer uses new higher frequency bands to provide high data rate transmission. The coverage layer could be supported by enhanced LTE RAT (Long Term Evolution Radio Access Technology), while the capacity layer could be supported by a new RAT dedicated to higher frequency bands. Furthermore, integration of the coverage and capacity layers is enabled by the tight interworking (e.g., dual connectivity) between the enhanced LTE RAT and the new RAT.

Dual connectivity is a mode of operation for a UE (User Equipment) in RRC_CONNECTED, configured with a Master Cell Group and a Secondary Cell Group as discussed in 3GPP R2-145410. A Master Cell Group is a group of serving cells associated with the MeNB (Master Evolved Node B), comprising of the PCell (Primary Cell) and optionally one or more SCell (Secondary Cell). A Secondary Cell Group is a group of serving cells associated with the SeNB (Secondary Evolved Node B), comprising of a SpCell (Special Cell) and optionally one or more SCell (Secondary Cell). A UE configured with dual connectivity generally means that the UE is configured to utilize radio resources that are provided by two distinct schedulers, and located in two eNBs (MeNB and SeNB) connected via a non-ideal backhaul over the X2 interface. Furthermore, C-plane messages are communicated via MeNB. Further details of dual connectivity can be found in 3GPP R2-145410.

In dual connectivity, a random access (RA) procedure may be performed upon SCG (Secondary Cell Group) addition, DL (downlink) data arrival, and UL (uplink) data arrival to achieve uplink synchronization. There are two different types of RA procedures: contention-based RA and contention-free RA.

Figure 5:
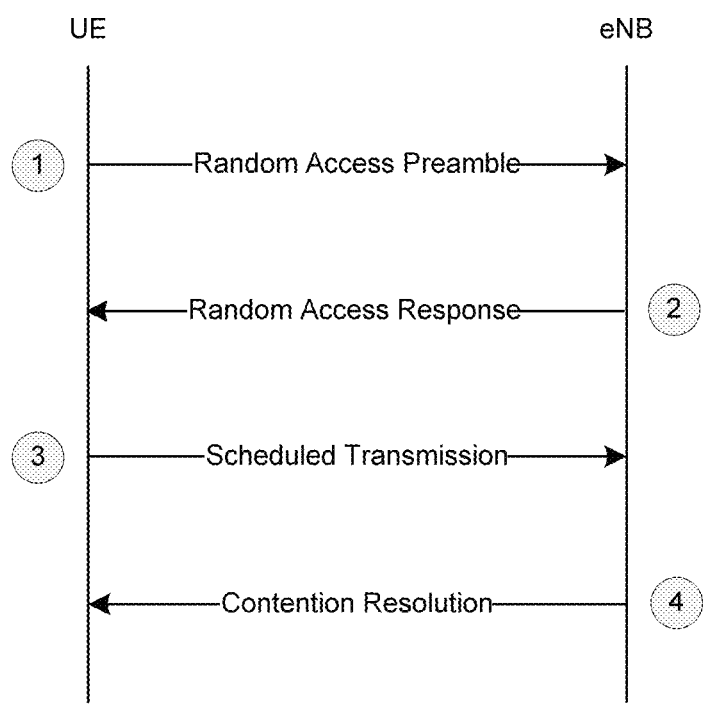
FIG. 5 illustrates a contention-based Random Access procedure.

A contention based RA procedure is shown in FIG. 5 and includes the following four steps:
1. Random Access Preamble is transmitted by UE on RACH (Random Access Channel), and is mapped to PRACH (Physical Random Access Channel);
2. Random Access Response is received from eNB on DL-SCH (Downlink Shared Channel), and is mapped to PDSCH (Physical Uplink Shared Channel);
3. Scheduled Transmission is transmitted by UE on UL-SCH (Uplink-Shared Channel), and is mapped to PUSCH (Physical Uplink Shared Channel); and
4. Contention Resolution is received from eNB on PDCCH (Physical Downlink Control Channel) or on DL-SCH, and is mapped to PDSCH.

Figure 6:
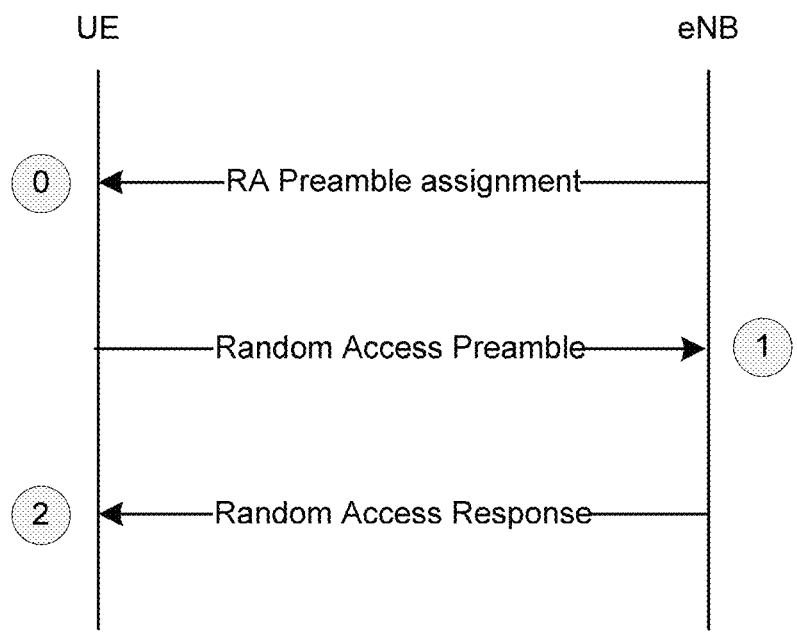
FIG. 6 illustrates a contention-free Random Access procedure.

A contention-free RA procedure is shown in FIG. 6 and includes the following three steps:
1. Random Access Preamble assignment is received from eNB (evolved Node B);
2. Random Access Preamble is transmitted by UE on UL-SCH (Uplink-Shared Channel), and is mapped to PUSCH; and
3. Random Access Response is received from eNB on DL-SCH (Downlink Shared Channel), and is mapped to PDSCH.

After transmitting a RA preamble, a UE shall monitor a PDCCH for RA response(s) from an eNB (i.e., a base station) in a RA response window, which starts at the subframe (or TTI (Transmission Time Interval)) that contains the end of the preamble transmission plus three subframes and has length ra-ResponseWindowSize subframes, as discussed in 3GPP TS 36.321 V12.3.0. If the UE does not receive a valid RA response from the eNB within the RA response window, the UE shall retransmit a RA preamble until the maximum number of retransmissions has been reached or a valid RA response is received. Thus, it might take more than one run to complete a RA procedure. Details of a RA procedure can be found in 3GPP R2-145410 and TS 36.321 V12.3.0.

In the current LTE RAT, a UE periodically transmits a sounding reference symbol/signal (SRS) for channel quality estimation to enable frequency-selective scheduling on the uplink. Thus, the resources for SRS transmissions cover wider bandwidth. Details of a UE sounding procedure can be found in 3GPP TS 36.213 V12.3.0.

Cells on the capacity layer may use beam forming, which is a signal processing technique used in antenna arrays for directional signal transmission or reception. This is achieved by combining elements in a phased array in such a way that signals at particular angles experience constructive interference while others experience destructive interference. Beam forming can be used at both the transmitting and receiving ends in order to achieve spatial selectivity. The improvement compared with omnidirectional reception/transmission is known as the receive/transmit gain.

The benefit of cochannel interference reduction and radio resource reuse makes beam forming attractive to a mobile communication system designer. U.S. Patent Publication No. 2010/0165914 generally discloses the concept of beam division multiple access (BDMA) based on the beam forming technique. In BDMA, a base station can communicate with a UE via a narrow beam to obtain the receive/transmit gain. Also, two UEs in different beams can share the same radio resources at the same time; and thus the capacity of a mobile communication system can increase greatly. To achieve that, the base station should know the beam in which a UE can communicate with the base station.

Furthermore, U.S. Pat. No. 7,184,492 generally discloses using beam forming antenna to coherently transmit an information signal to a receiver using two or more directional beams. In one embodiment, the phase and timing of the information signals carried by each directional beams are adjusted such that the signals arrive synchronously at the mobile terminal. Time synchronization may be obtained by delaying signals transmitted on selected directional beams to compensate for different propagation delays, or by preconditioning and filtering the signals using a channel coefficient matrix.

As discussed in 3GPP TS 36.300 V12.5.0, the frame structure in LTE is organized into radio frames and each radio frame (e.g., 10 ms), and is divided into ten subframes. As stated in 3GPP TS 36.300 V12.5.0, each subframe may include two slots as follows:

5 Physical Layer for E-UTRA

Downlink and uplink transmissions are organized into radio frames with 10 ms duration. Two radio frame structures are supported:

Type 1, applicable to FDD;
　　Type 2, applicable to TDD.

Figure 7:
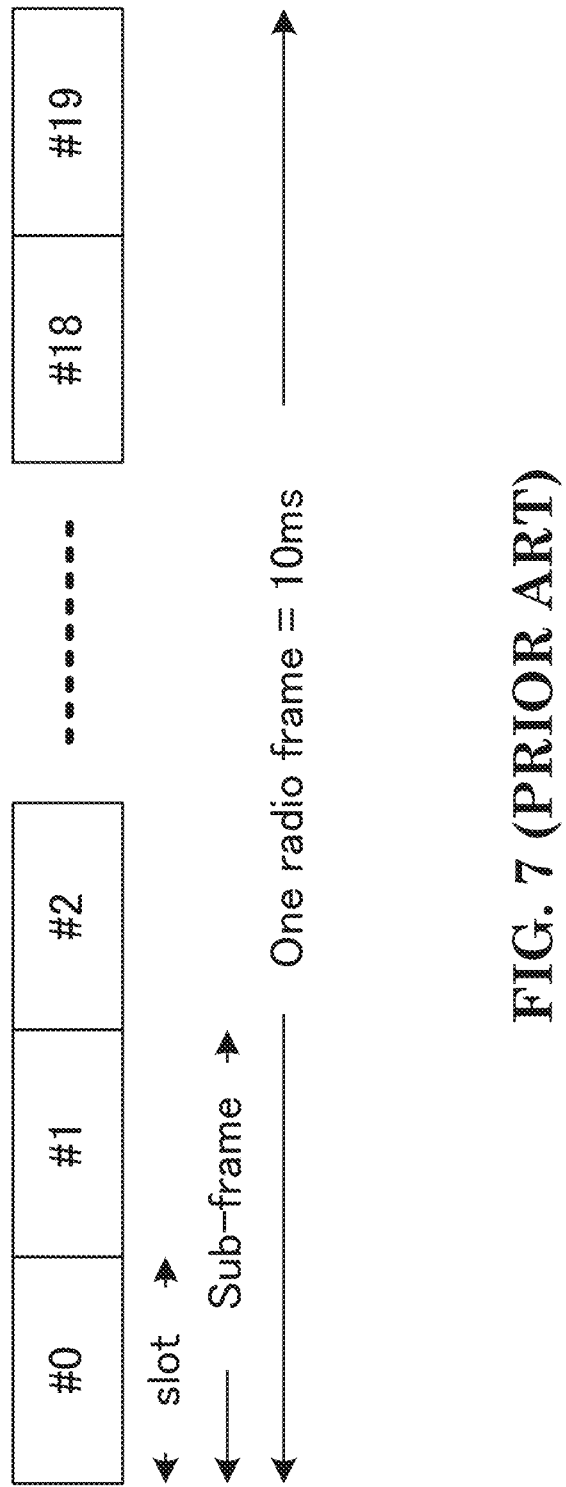
FIG. 7 is a reproduction of Figure 5.1-1 of 3GPP TS 36.300 V12.5.0.

Frame structure Type 1 is illustrated in Figure 5.1-1 [which has been reproduced as FIG. 7 of the present application]. Each 10 ms radio frame is divided into ten equally sized sub-frames. Each sub-frame consists of two equally sized slots. For FDD, 10 subframes are available for downlink transmission and 10 subframes are available for uplink transmissions in each 10 ms interval. Uplink and downlink transmissions are separated in the frequency domain.

[Figure 5.1-1 has been reproduced as FIG. 7 of the present application]

Figure 8:
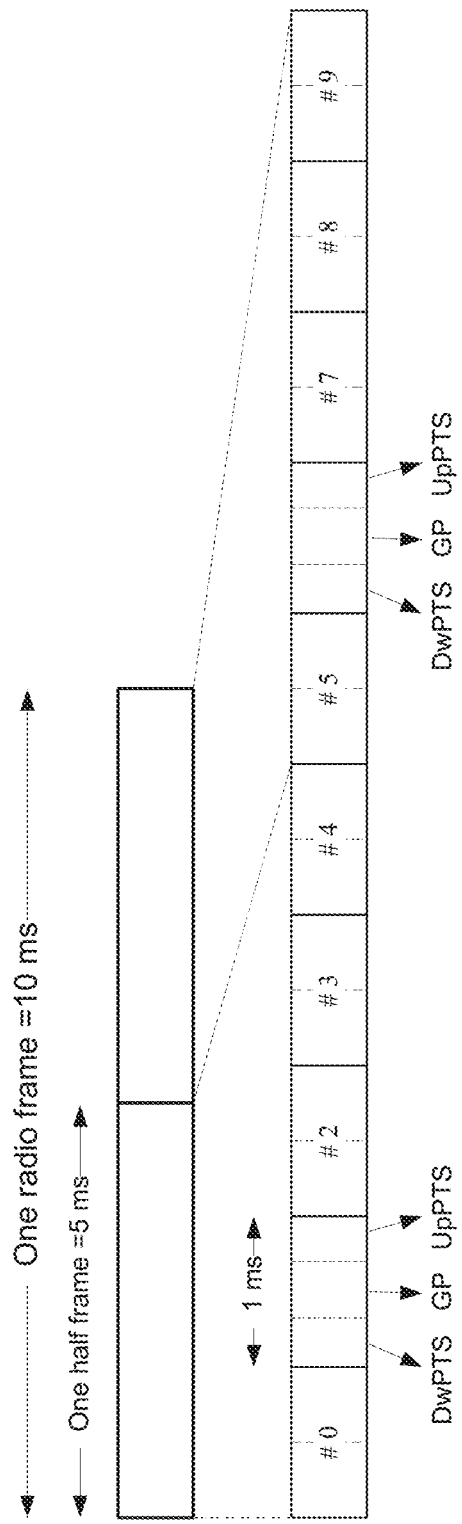
FIG. 8 is a reproduction of Figure 5.1-2 of 3GPP TS 36.300 V12.5.0.

Frame structure Type 2 is illustrated in Figure 5.1-2 [which has been reproduced as FIG. 8 of the present application]. Each 10 ms radio frame consists of two half-frames of 5 ms each. Each half-frame consists of eight slots of length 0.5 ms and three special fields: DwPTS, GP and UpPTS. The length of DwPTS and UpPTS is configurable subject to the total length of DwPTS, GP and UpPTS being equal to 1 ms. Both 5 ms and 10 ms switch-point periodicity are supported. Subframe 1 in all configurations and subframe 6 in configuration with 5 ms switch-point periodicity consist of DwPTS, GP and UpPTS. Subframe 6 in configuration with 10 ms switch-point periodicity consists of DwPTS only. All other subframes consist of two equally sized slots.

For TDD, GP is reserved for downlink to uplink transition. Other Subframes/Fields are assigned for either downlink or uplink transmission. Uplink and downlink transmissions are separated in the time domain.

[Figure 5.1-2 has been reproduced as FIG. 8 of the present application]

[Table 5.1-1 "Uplink-downlink allocations" has been reproduced as FIG. 9 of the present application]

Figure 10:
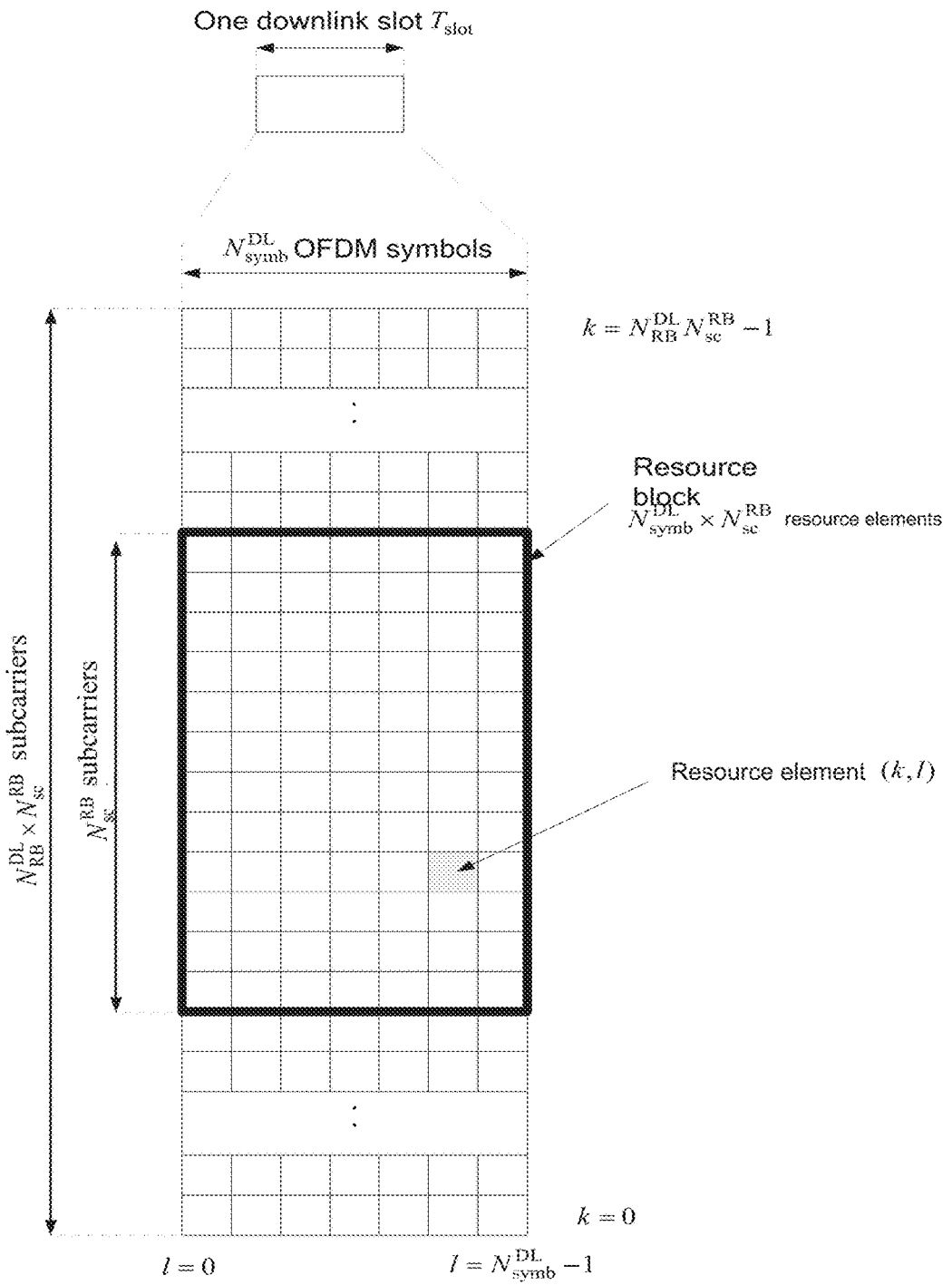
FIG. 10 is a reproduction of Figure 6.2.2-1 of 3GPP TS 36.211 V12.5.0.

Each downlink slot includes $N_{symb}^{DL}$ OFDM symbols as shown in Figure 6.2.2-1 (which has been reproduced as FIG. 10 of the present application) and in Table 6.2.3-1 (which has been reproduced as FIG. 11 of the present application) of 3GPP TS 36.211 V12.5.0. Figure 6.2.2-1 of 3GPP TS 36.211 V12.5.0 has been reproduced as FIG. 10 of the present application. Table 6.2.3-1 "Physical resource blocks parameters" of 3GPP TS 36.211 V12.5.0 has been reproduced as FIG. 11 of the present application.

Figure 12:
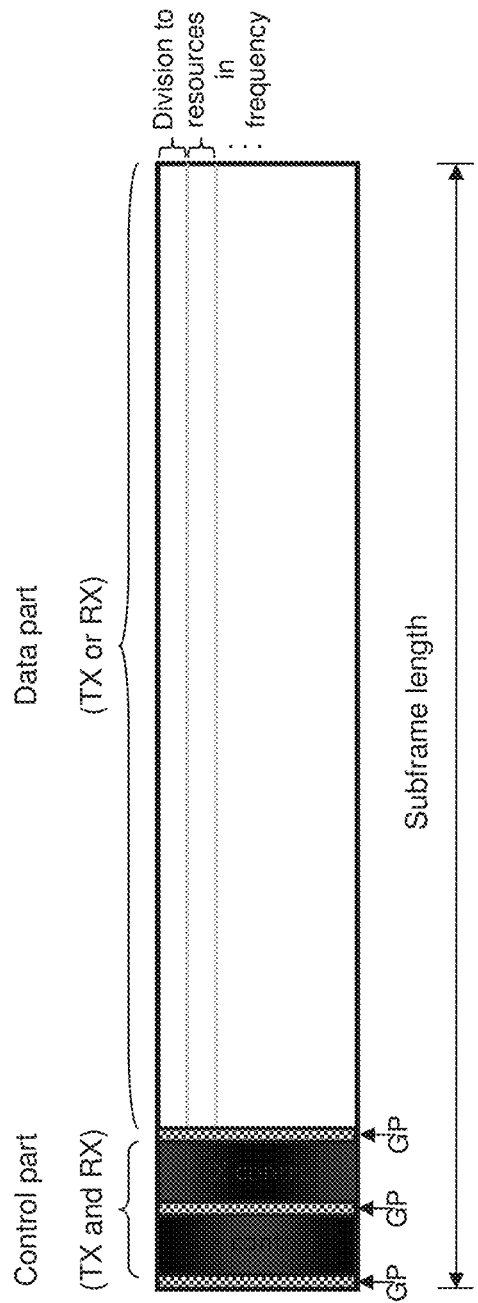
FIG. 12 illustrates a physical subframe structure for a UDN (Ultra-Dense Network) system.

A TDD (Time Division Duplex) optimized physical subframe structure for a UDN (Ultra Dense Network) system proposed by METIS Deliverable D2.4 "Proposed solutions for new radio access" is illustrated in FIG. 12 while following the main design principles listed below:

A bi-directional (including both DL and UL resources) control part is embedded to the beginning of each subframe and time-separated from data part.

Data part in one subframe contains data symbols for either transmission or reception. Demodulation Reference Signal (DMRS) symbols, which are used to estimate the channel and its covariance matrix, could be located, for example, in the first OFDM (Orthogonal Frequency-Division Multiplexing) symbol in the dynamic data part and could be precoded with the same vector or matrix as data.

Short subframe lengths, such as e.g. 0.25 ms on cmW frequencies when assuming 60 kHz SC spacing, are feasible. By following the principles of harmonized OFDM concept, the frame numerology is further scaled when moving to mmW, leading to even shorter frame length (e.g., in the order of 50 µs).

In frequency direction, the spectrum could be divided to separate allocable frequency resources.

The bi-directional control part of the subframe allows the devices in the network to both receive and send control signals, such as scheduling requests (SRs) and scheduling grants (SGs), in every subframe. In addition to the scheduling related control information, the control part may also contain reference signals (RS) and synchronization signals used for cell detection and selection, scheduling in frequency domain, precoder selection, and channel estimation.

To find beam(s) in which a UE can communicate with a base station, it is proposed in US Patent Publication No. 2010/0165914 that the UE transmits its position and speed to the base station, and the base station then determines the direction of a downlink beam for the UE according to the received position and speed. In this way, however, the base station may not able to determine the UE's beams accurately, due to the very complicated propagation environment in mobile cellular systems. In addition, typically not all UEs in a cell are equipped with positioning capability (e.g., low end devices). As a result, the benefit of BDMA (Beam Division Multiple Access) cannot be enjoyed if there are many low end devices in a cell. Other ways for a base station to determine UE's beams could and should be considered to improve this drawback.

Figure 13:
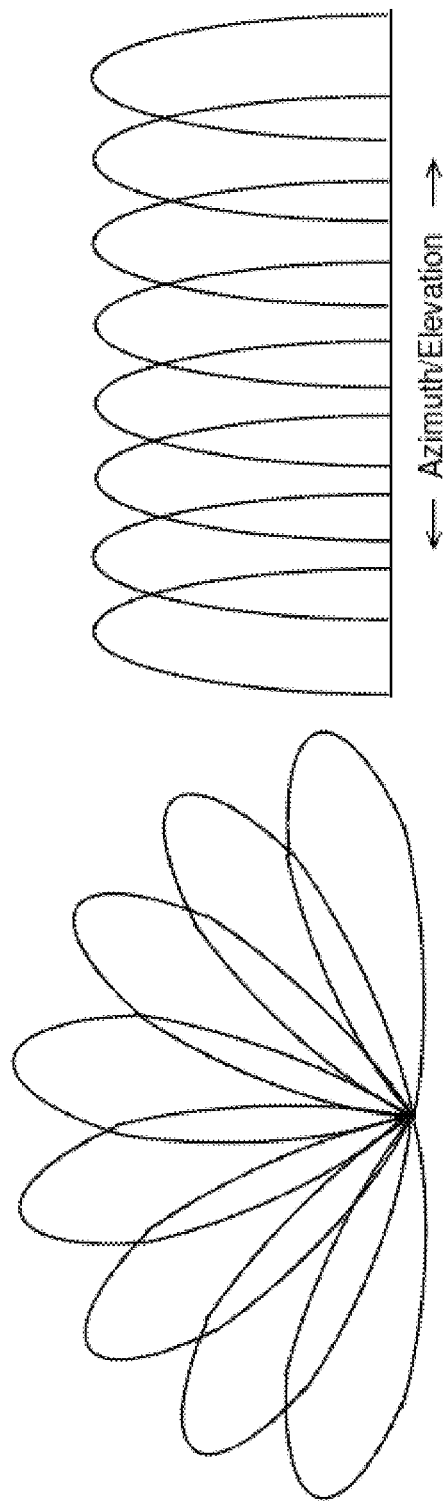
FIG. 13 is a diagram according to one exemplary embodiment.

A potential beam pattern applied by a base station for transmission and/or reception in a cell could be fixed as shown in FIG. 13. That is the number of beams and the beam-widths of beams in a cell are fixed, while the beam-widths of beams in different directions could be different. Due to multiple propagation paths or overlapping between two neighboring beams, it is likely that multiple beams would be used by a UE for communicating with the base station. In this situation, the base station needs to determine the beam set used by a UE (e.g., by monitoring an uplink signal transmitted from the UE).

Since a random access (RA) procedure needs to be performed by a UE before data can be transferred via a cell, it would be beneficial for the base station to determine the initial beam set of a UE during the RA procedure, especially if a dedicated RA preamble is used. For example, the beam set could be determined according to the beam(s) via which the dedicated RA preamble(s) is (are) received from the UE.

Considering the enlarged number of antennas with wider bandwidth, it is quite challenging in terms of overall cost and power consumption to implement beam forming in a cell with one transceiver per antenna element. As a result, the maximum number of beams which could be generated by a cell at one time could be less than the total number of beams covered by a cell. Thus, it may take several times for the cell to scan all beams of the cell. In this situation, the base station would miss a dedicated RA preamble transmitted from a UE if none of the beams points to the direction of the UE when the RA preamble is transmitted. As a result, several runs of random access may be required to successfully complete a RA procedure, which would cause latency to the subsequent data transfer via the cell. In addition, resource sharing between the concerned UE and other UEs in the cell would be delayed. This is undesirable.

Figure 14:
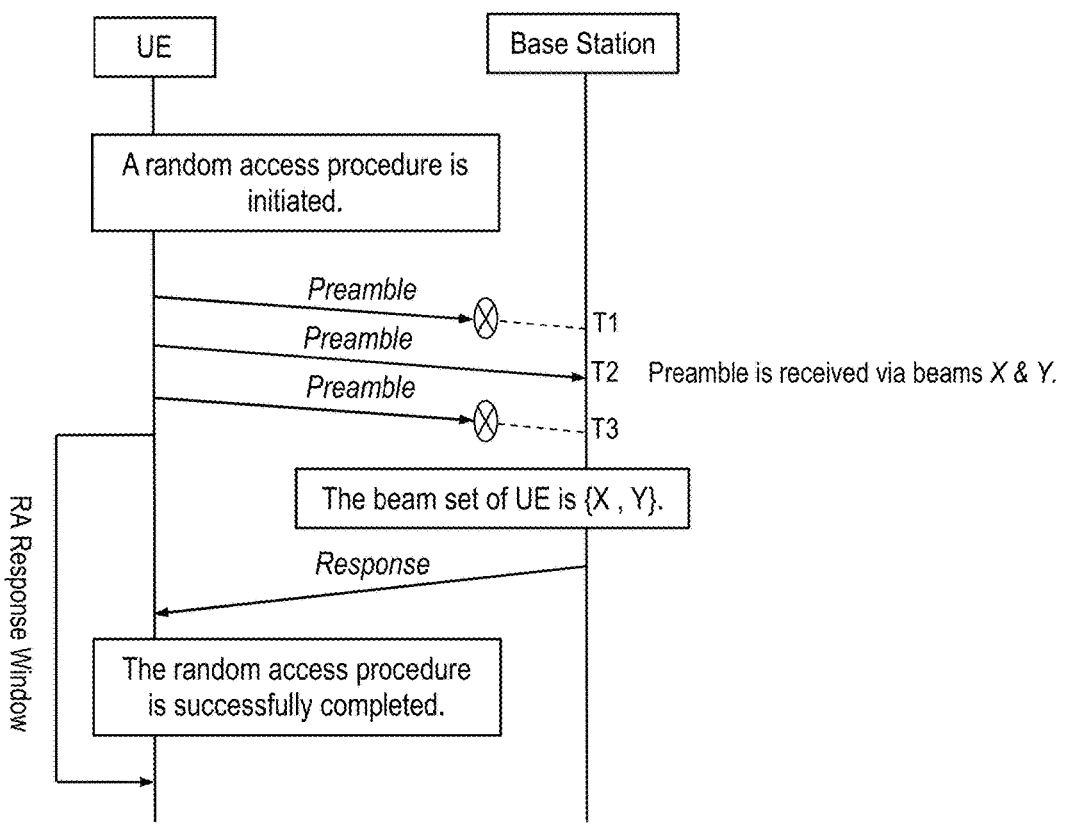
FIG. 14 is a message flow diagram according to one exemplary embodiment.

To reduce the latency, a potential solution is for a UE to transmit multiple RA preambles in a short period of time before it starts monitoring a PDCCH for RA response(s) from the base station. The base station would then be allowed to complete scanning all beams of the cell so as to receive at least one RA preamble from the UE. With this solution, a RA procedure could be successfully completed without too much latency. FIG. 14 shows an example of this solution according to one exemplary embodiment.

In FIG. 14, it is assumed the UE is located in beams X and Y. The base station monitors preambles at T1, T2, and T3 for receiving preambles via different beams of the cell. In this example, multiple beams could be monitored at each time. The preamble transmitted by the UE is received via beams X and Y at T2. Thus, the beam set of the UE is {X, Y}. It is possible that preambles transmitted by the UE could be received at different times. On the other hand, the base station does not transmit any RA response to the UE until all the multiple beams of the cell has been monitored. In other words, the base station transmits a RA response to the UE after all beams of the cell has been monitored if there is any RA preamble received.

Figure 15:
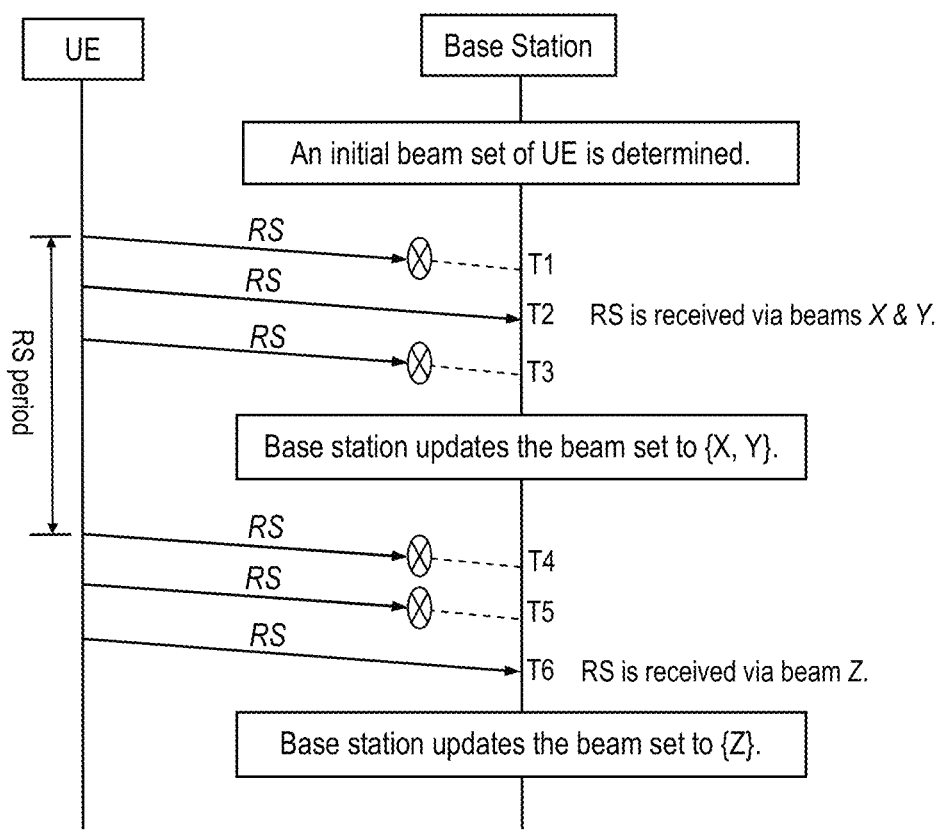
FIG. 15 is a message flow diagram according to one exemplary embodiment.

Preferably, the base station could determine a beam set of the UE according to the beam(s) via which RA preamble(s) is (are) received from the UE. After the initial beam set of a UE has been determined, the base station needs to continue tracking the UE and update the beam set due to UE mobility. It seems possible for the base station to track the beam set of a UE based on periodic SRS-like reference signal (RS) transmissions from the UE, wherein it could be sufficient for the SRS-like RS to cover narrower bandwidth. Then, the beam set could be updated according to the beam(s) via which the RS(s) is (are) received from the UE. More precisely, a potential solution is for the UE to transmit multiple RSs in each period, which would allow the base station to complete scanning all beams of the cell in a short time so as to receive at least one RS from the UE for updating the beam set of the UE. FIG. 15 illustrates an example of this solution according to one exemplary embodiment.

In FIG. 15, a UE periodically transmits RSs for beam set update after an initial beam set of the UE has been determined by a base station. During the first period, the base station monitors RS at T1, T2, and T3 via different beams of the cell and RS is received via beams X and Y at T2. The beam set of the UE is updated to {X, Y}. Due to UE mobility, RS is received via beam Z alone at T6 during the second period. As a result, the new beam set is {Z}. In this example, multiple beams are monitored at each time. It is also possible that RSs transmitted by the UE could be received at different times.

In general, there could be two different ways for the base station to control beam set tracking, including a distributed way and a centralized way. In the distributed way, each UE would be tracked individually at UE specific times and is allocated with RS resources, wherein the RS resources define periodic resources for RS transmissions and there are multiple occasions with resources for transmissions of multiple RSs by the UE in each RS period. In one embodiment, an occasion refers to a time unit (e.g., a symbol, a time slot, or a subframe).

Figure 16:
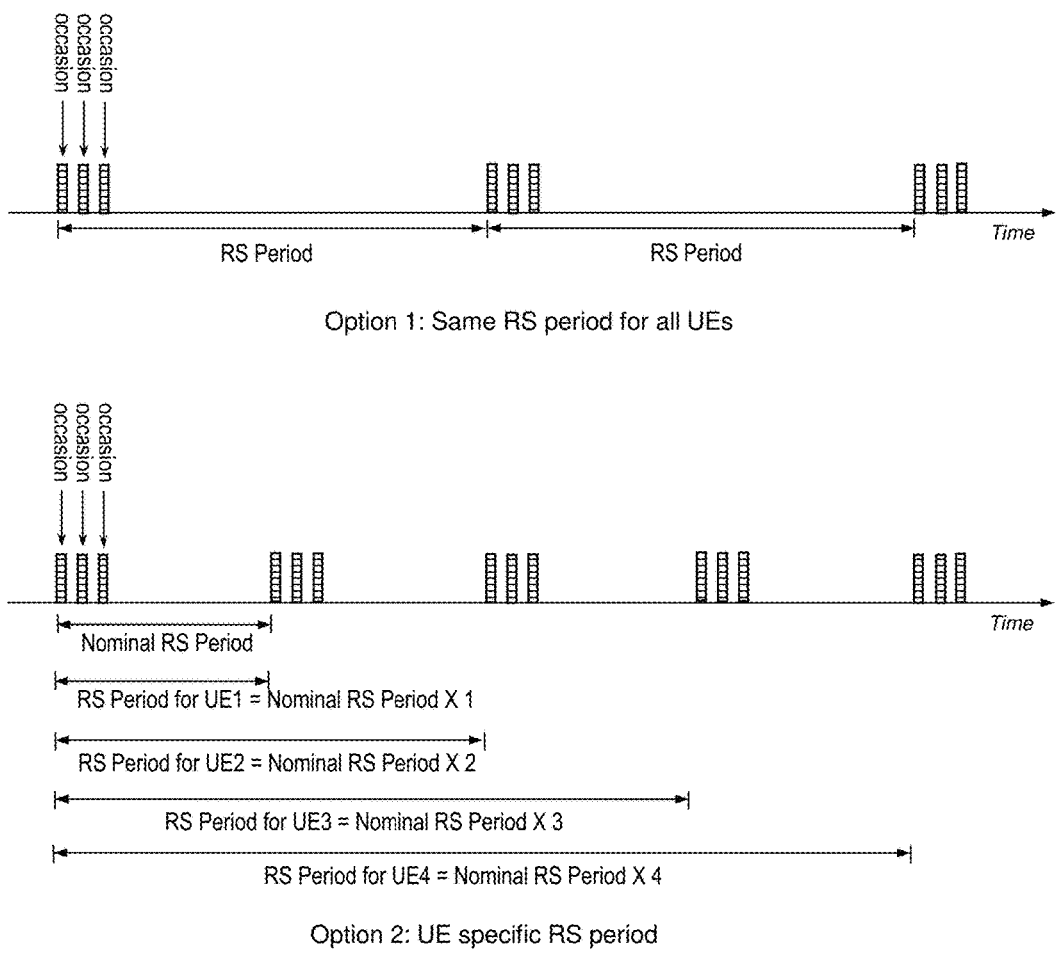
FIG. 16 is a timing diagram according to one exemplary embodiment.

In the centralized way, all UEs (which need to be tracked in the cell) are tracked at common occasions so that the base station only needs to monitor those occasions to receive RSs transmitted by all UEs. In one embodiment, all UEs share one RS period. In another embodiment, UEs may have different RS periods, while timings of all RS periods are synchronized. For example, there is a nominal RS period and a RS period of each UE is a multiple of the nominal RS period. FIG. 16 shows examples of these two options. For Option 1, all UEs share one RS period and the base station needs to monitor RSs from all UEs in each RS period (i.e., the tracking period=the RS period), while the base station needs to monitor RSs from UEs in each nominal RS period (i.e., the tracking period=the nominal RS period X 1) for Option 2 (i.e., UE specific RS period). In one embodiment, each occasion of a RS period is shared by all UEs which need to be tracked (in case there are sufficient RS resources on each occasion for all UEs). In another embodiment, different occasions of the RS period are occupied by different UEs.

If digital beam-former is used for implementing a cell, there would be no problem to have one transceiver per antenna element i.e. all beams of the cell can be generated at one time. Thus, each UE would only need to transmit a single RS for base station to determine the beam set of the UE. Similar methods for beam tracking described above for a cell with analog beam-former are also applicable to a cell with digital beam-former. In this situation (i.e., a cell with digital beam-former), the base station would only need to allocate RS resources to each UE for one single RS transmission on one occasion in each RS period for beam tracking if digital beam-former is used. It is possible that all UEs share one RS period or UEs may have different RS periods. In one embodiment, each occasion of a RS period is shared by all UEs which need to be tracked. In another embodiment, different occasions of the RS period are occupied by different UEs.

A TDD optimized physical subframe structure for a UDN system is proposed by METIS Deliverable D2.4 "Proposed solutions for new radio access". In general, there are one uplink control part, one downlink control part, and one data part as shown in FIG. 12. To support BDMA, an uplink control part may need to contain PUCCH (Physical Uplink Control Channel) signaling for HARQ ACK/NACK (Hybrid Automatic Repeat Request Acknowledgement/Negative Acknowledgement) and RS for UE beam set detection. The UE would send a HARQ ACK/NACK in response to a downlink transmission from a base station. Since PUCCH signaling for HARQ ACK/NACK and RS for UE beam set detection may be transmitted by different UEs and received by the base station via different beams, it is more flexible in term of scheduling to have at least two symbols in the uplink control part: (1) one symbol contains RS resources for UE beam set detection and (2) another symbol not contain any RS resource for UE beam set detection. In one embodiment, the symbol which contains RS resources for UE beam set detection may also contain resources for HARQ ACK/NACK signaling. This embodiment would be feasible if the beam(s) used by the base station to receive PUCCH signaling for HARQ ACK/NACK is the same as the beam(s) used for monitoring RS for UE beam set detection. Otherwise, the base station may miss the PUCCH signaling for HARQ ACK/NACK, which would degrade the transmission performance.

Figure 17:
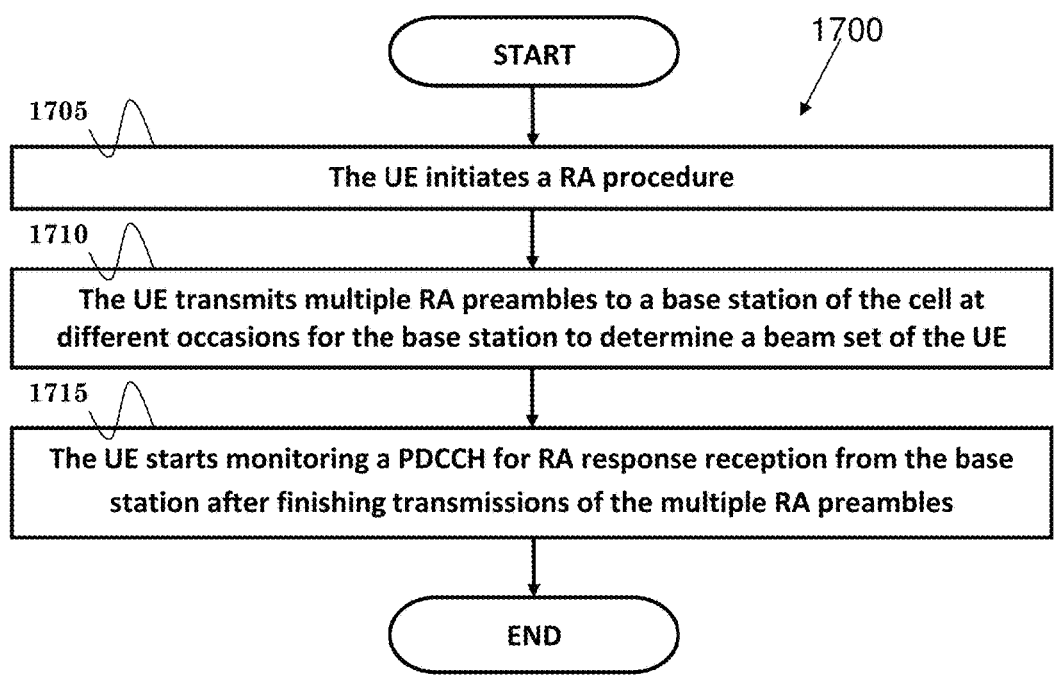
FIG. 17 is a flow chart according to one exemplary embodiment.

FIG. 17 is a flow chart 1700, in accordance with one exemplary embodiment, outlining a method for preamble transmissions by a UE in a cell of a wireless communication system, wherein there are multiple beams in the cell. In step 1705, the UE initiates a random access (RA) procedure. In step 1710, the UE transmits multiple RA preambles to a base station of the cell at different occasions for the base station to determine a beam set of the UE.

In step 1715, the UE starts monitoring a Physical Downlink Control Channel (PDCCH) for RA response reception from the base station after finishing transmissions of the multiple RA preambles. In one embodiment, the UE monitors the PDCCH for RA response reception in a RA response window. Furthermore, the RA response window could start at a subframe that contains an end of a transmission of the last RA preamble of the multiple RA preambles plus a number of subframes and has a length configured to the UE. More specifically, the RA response window could start at a subframe that contains the end of the transmission of the last RA preamble transmission plus three (3) subframes. Furthermore, the UE could receive one RA response for the UE within the RA response window.

In one embodiment, the UE could decode each RA response individually without combining multiple RA responses. In another embodiment, the UE could be within normal coverage of the base station, such as the received signal quality of the UE from the base station is above a threshold, so that the UE could decode each RA response individually without combining multiple RA responses.

Referring back to FIGS. 3 and 4, in one embodiment from the perspective of a UE, the device 300 includes a program code 312 stored in memory 310 of the transmitter. The CPU 308 could execute program code 312 (i) to initiate a RA procedure, (ii) to transmit multiple RA preambles to a base station of the cell at different occasions for the base station to determine a beam set of the UE, and (iii) to start monitoring a Physical Downlink Control Channel (PDCCH) for RA response reception from the base station after finishing transmissions of the multiple RA preambles. In addition, the CPU 308 can execute the program code 312 to perform all of the above-described actions and steps or others described herein.

Figure 18:
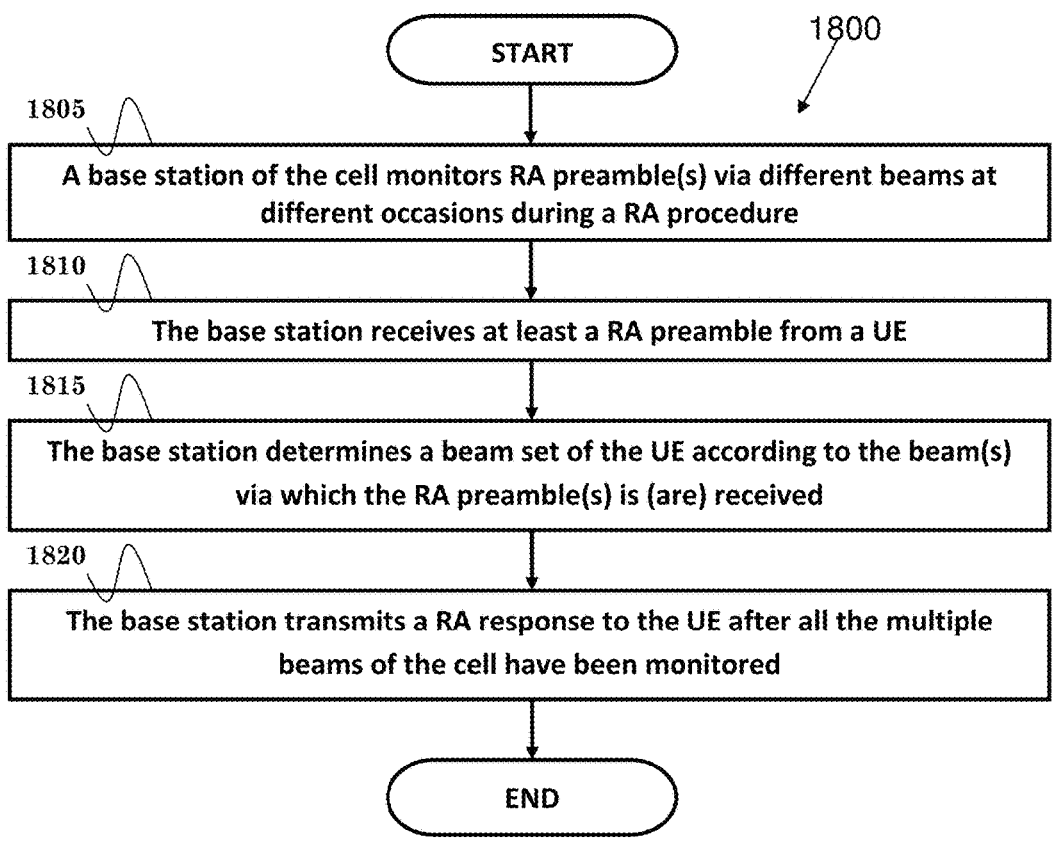
FIG. 18 is a flow chart according to one exemplary embodiment.

FIG. 18 is a flow chart 1800 from the perspective of a base station in accordance with one exemplary embodiment. In general, the flow chart 1800 outlines a method for beam finding in a cell of a wireless communication system, wherein there are multiple beams in the cell. In step 1805, a base station of the cell monitors RA preamble(s) via different beams at different occasions during a RA procedure. In step 1810, the base station receives at least a RA preamble from a UE. In step 1815, the base station determines a beam set of the UE according to the beam(s) via which the RA preamble(s) is (are) received.

In step 1820, the base station transmits a RA response to the UE after all the multiple beams of the cell have been monitored. In one embodiment, the base station transmits only one RA response to the UE in response to receptions of multiple RS preambles from the UE during the RA procedure. Furthermore, multiple beams are monitored at each occasion. In addition, an occasion refers to a time unit (e.g., a symbol, a time slot, or a subframe).

In one embodiment, the RA preamble is dedicated to the UE. In addition, the RA preamble being dedicated to the UE could mean the RA preamble of the UE is distinguishable from RA preambles of other UEs in the cell in at least one of following domains: time domain, frequency domain, and sequence domain.

Referring back to FIGS. 3 and 4, in one embodiment from the perspective of a base station, the device 300 includes a program code 312 stored in memory 310 of the transmitter. The CPU 308 could execute program code 312 (i) to monitor RA preamble(s) via different beams at different occasions during a RA procedure, (ii) to receive at least a RA preamble from a UE, and (iii) to determine a beam set of the UE according to the beam(s) via which the RA preamble(s) is (are) received. In addition, the CPU 308 could execute program code 312 to transmit a RA response to the UE after all the multiple beams of the cell have been monitored. Furthermore, the CPU 308 can execute the program code 312 to perform all of the above-described actions and steps or others described herein.

Figure 19:
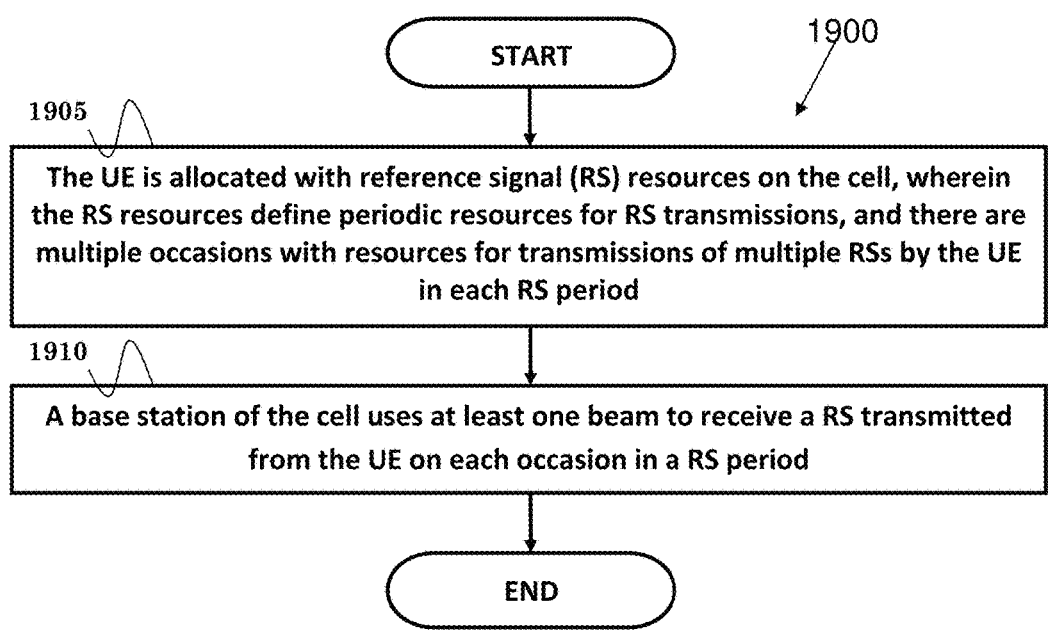
FIG. 19 is a flow chart according to one exemplary embodiment.

FIG. 19 is a flow chart 1900, in accordance with one exemplary embodiment, outlining a method for determining a beam set used by a UE in a cell of a wireless communication system, wherein there are multiple beams in the cell. In general, the method outlined in the flow chart 1900 could be applied by a base station in distributed and centralized settings.

In step 1905, the UE is allocated with reference signal (RS) resources on the cell, wherein the RS resources define periodic resources for RS transmissions, and there are multiple occasions with resources for transmissions of multiple RSs by the UE in each RS period. In step 1910, a base station of the cell uses at least one beam to receive a RS transmitted from the UE on each occasion in a RS period. In one embodiment, the base station uses different sets of beams to receive RSs transmitted from the UE on different occasions in the RS period. Furthermore, the total beams could be used to receive RSs transmitted from the UE in the RS period cover all beams of the cell.

In one embodiment, the multiple occasions could be UE specific. In an alternative embodiment, the multiple occasions could be shared by UEs which need to be tracked.

Referring back to FIGS. 3 and 4, the device 300 includes a program code 312 stored in memory 310 of the transmitter. The CPU 308 could execute program code 312 (i) to enable the UE to be allocated with RS resources on the cell, wherein the RS resources define periodic resources for RS transmissions, and there are multiple occasions with resources for transmissions of multiple RSs by the UE in each RS period, and (ii) to enable a base station to use at least one beam to receive a RS transmitted from the UE on each occasion in a RS period. In addition, the CPU 308 can execute the program code 312 to perform all of the above-described actions and steps or others described herein.

Figure 20:
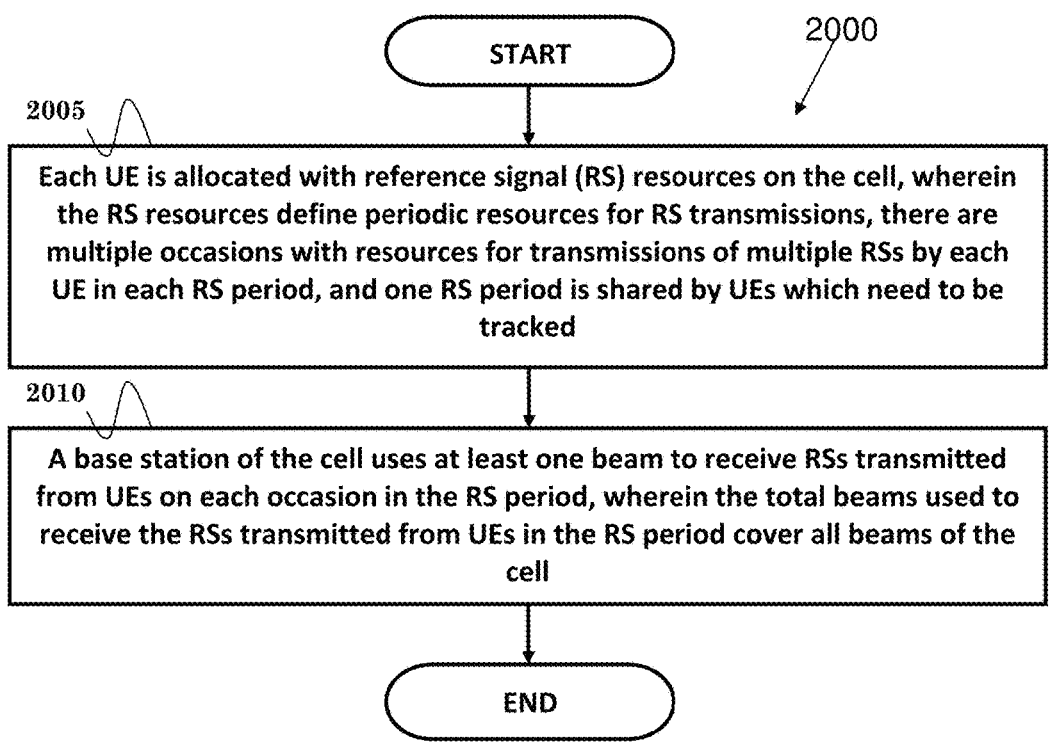
FIG. 20 is a flow chart according to one exemplary embodiment.

FIG. 20 is a flow chart 2000, in accordance with one exemplary embodiment, outlining a method for determining beam sets used by UEs in a cell of a wireless communication system, wherein each UE has its own beam set and there are multiple beams in the cell. In general, the method outlined in the flow chart 2000 could be applied by a base station in a centralized setting and to the same RS period for all UEs.

In step 2005, each UE is allocated with reference signal (RS) resources on the cell, wherein the RS resources define periodic resources for RS transmissions, there are multiple occasions with resources for transmissions of multiple RSs by each UE in each RS period, and one RS period is shared by UEs which need to be tracked. In step 2010, a base station of the cell uses at least one beam to receive RSs transmitted from UEs on each occasion in the RS period, wherein the total beams used to receive the RSs transmitted from UEs in the RS period cover all beams of the cell.

In one embodiment, the base station determines the beam set used by the UE according to the beam(s) via which RS(s) is (are) received from the UE. In another embodiment, the base station could transmit a message to allocate the RS resources to the UE (for single connectivity). In an alternative embodiment, a second base station of a second cell serving the UE could transmit a message to allocate the RS resources to the UE (for dual connectivity).

In one further embodiment, the beam set used by a UE contains at least one beam. Furthermore, an occasion refers to a time unit (e.g., a symbol, a time slot, or a subframe).

Referring back to FIGS. 3 and 4, the device 300 includes a program code 312 stored in memory 310 of the transmitter. The CPU 308 could execute program code 312 (i) to enable each UE to be allocated with RS resources on the cell, wherein the RS resources define periodic resources for RS transmissions, there are multiple occasions with resources for transmissions of multiple RSs by each UE in each RS period, and one RS period is shared by UEs which need to be tracked, and (ii) to enable a base station of the cell to use at least one beam to receive a RS transmitted from the UE on each occasion in a RS period. In addition, the CPU 308 can execute the program code 312 to perform all of the above-described actions and steps or others described herein.

Figure 21:
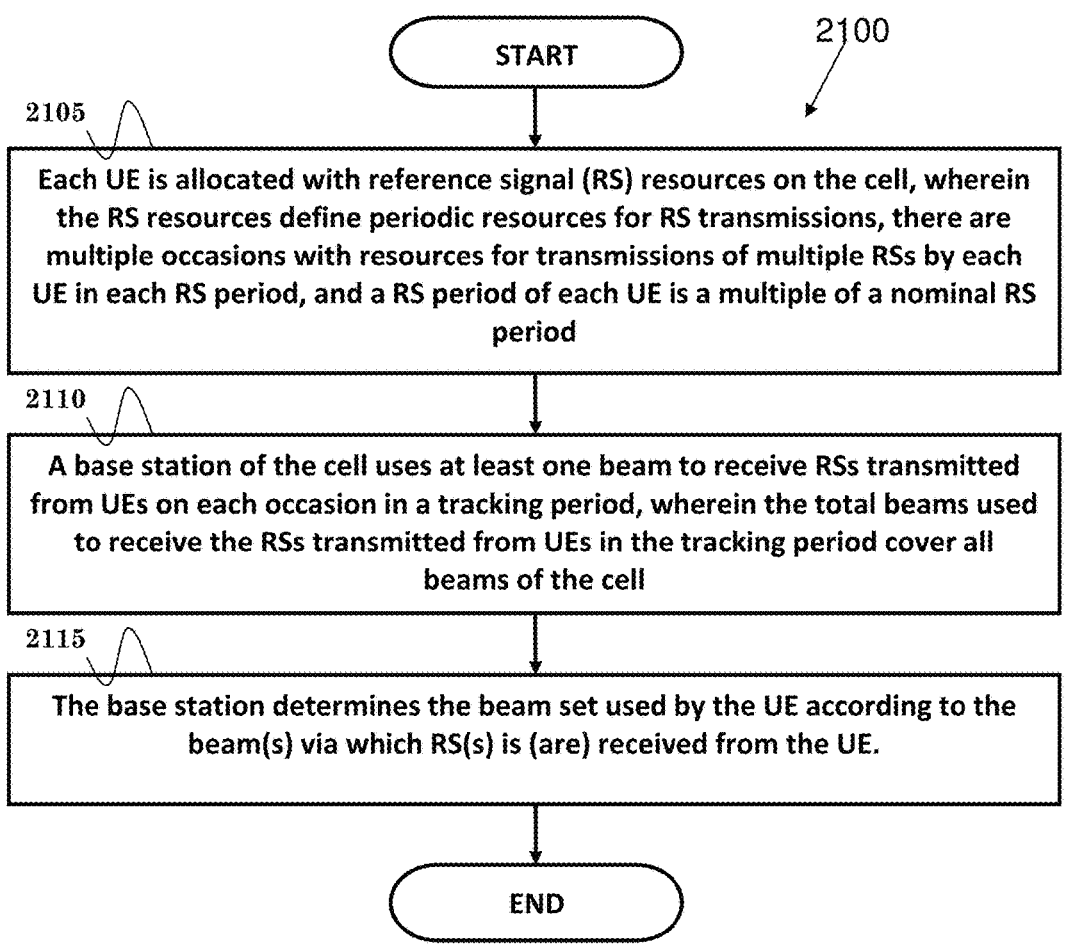
FIG. 21 is a flow chart according to one exemplary embodiment.

FIG. 21 is a flow chart 2100, in accordance with one exemplary embodiment, outlining a method for determining beam sets used by UEs in a cell from the perspective of a UE. In general, the method outlined in the flow chart 2100 could be applied by a base station in a centralized setting and to a UE-specific RS period.

In step 2105, each UE is allocated with reference signal (RS) resources on the cell, wherein the RS resources define periodic resources for RS transmissions, there are multiple occasions with resources for transmissions of multiple RSs by each UE in each RS period, and a RS period of each UE is a multiple of a nominal RS period. In step 2110, a base station of the cell uses at least one beam to receive RSs transmitted from UEs on each occasion in a tracking period, wherein the total beams used to receive the RSs transmitted from UEs in the tracking period cover all beams of the cell. In one embodiment, the tracking period could be determined according to the RS periods of UEs which need to be tracked. Furthermore, the tracking period could be a multiple of the nominal RS period. In addition, the tracking period could be equal to the nominal RS period.

In step 2115, the base station determines the beam set used by the UE according to the beam(s) via which RS(s) is (are) received from the UE. In one embodiment, the base station could transmit a message to allocate the RS resources to the UE (for single connectivity). In an alternative embodiment, a second base station of a second cell serving the UE could transmit a message to allocate the RS resources to the UE (for dual connectivity).

In one embodiment, the beam set used by a UE contains at least one beam. Furthermore, an occasion refers to a time unit (e.g., a symbol, a time slot, or a subframe).

Referring back to FIGS. 3 and 4, the device 300 includes a program code 312 stored in memory 310 of the transmitter. The CPU 308 could execute program code 312 (i) to enable each UE to be allocated with RS resources on the cell, wherein the RS resources define periodic resources for RS transmissions, there are multiple occasions with resources for transmissions of multiple RSs by each UE in each RS period, and a RS period of each UE is a multiple of a nominal RS period, (ii) to enable a base station of the cell to use at least one beam to receive RSs transmitted from UEs on each occasion in a tracking period, wherein the total beams used to receive the RSs transmitted from UEs in the tracking period cover all beams of the cell, and (iii) to enable the base station to determine the beam set used by the UE according to the beam(s) via which RS(s) is (are) received from the UE. In addition, the CPU 308 can execute the program code 312 to perform all of the above-described actions and steps or others described herein.

Figure 22:
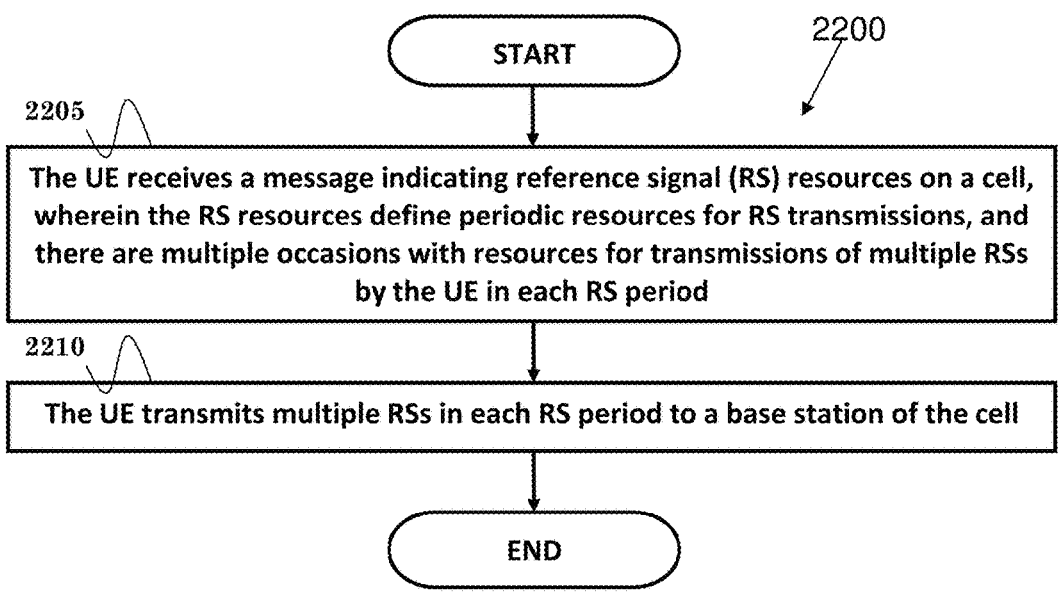
FIG. 22 is a flow chart according to one exemplary embodiment.

FIG. 22 is a flow chart 2200, in accordance with one exemplary embodiment, outlining a method for RS transmissions by a UE in a cell of a wireless system. In step 2205, the UE receives a message indicating reference signal (RS) resources on a cell, wherein the RS resources define periodic resources for RS transmissions, and there are multiple occasions with resources for transmissions of multiple RSs by the UE in each RS period. In step 2110, the UE transmits multiple RSs in each RS period to a base station of the cell.

In one embodiment, the UE could receive the message from the base station (for single connectivity). Alternatively, the UE could receive the message from a second base station of a second cell serving the UE (for dual connectivity). In addition, there could be multiple beams in the cell.

In one embodiment, an occasion could refer to a time unit in FDD (Frequency Division Duplex) mode (e.g., a symbol, a time slot, or a subframe). Alternatively, an occasion could refer to a time unit in TDD (Time Division Duplex) mode (e.g., a symbol in a normal subframe, a time slot, or a subframe). Furthermore, the multiple occasions could be contiguous, and each occasion of a RS period could be shared by all UEs which need to be tracked. In addition, different occasions of the RS period could be occupied by different UEs.

In one embodiment, the RSs could be dedicated to a particular UE, which means the RSs of the particular UE are distinguishable from RSs of other UEs in the cell in at least one of following domains: time domain, frequency domain, and/or sequence domain.

Referring back to FIGS. 3 and 4, in one embodiment from the perspective of a UE, the device 300 includes a program code 312 stored in memory 310 of the transmitter. The CPU 308 could execute program code 312 (i) to receive a message indicating reference signal (RS) resources on a cell, wherein the RS resources define periodic resources for RS transmissions, and there are multiple occasions with resources for transmissions of multiple RSs by the UE in each RS period, and (ii) to transmit multiple RSs in each RS period to a base station of the cell. In addition, the CPU 308 can execute the program code 312 to perform all of the above-described actions and steps or others described herein.

Figure 23:
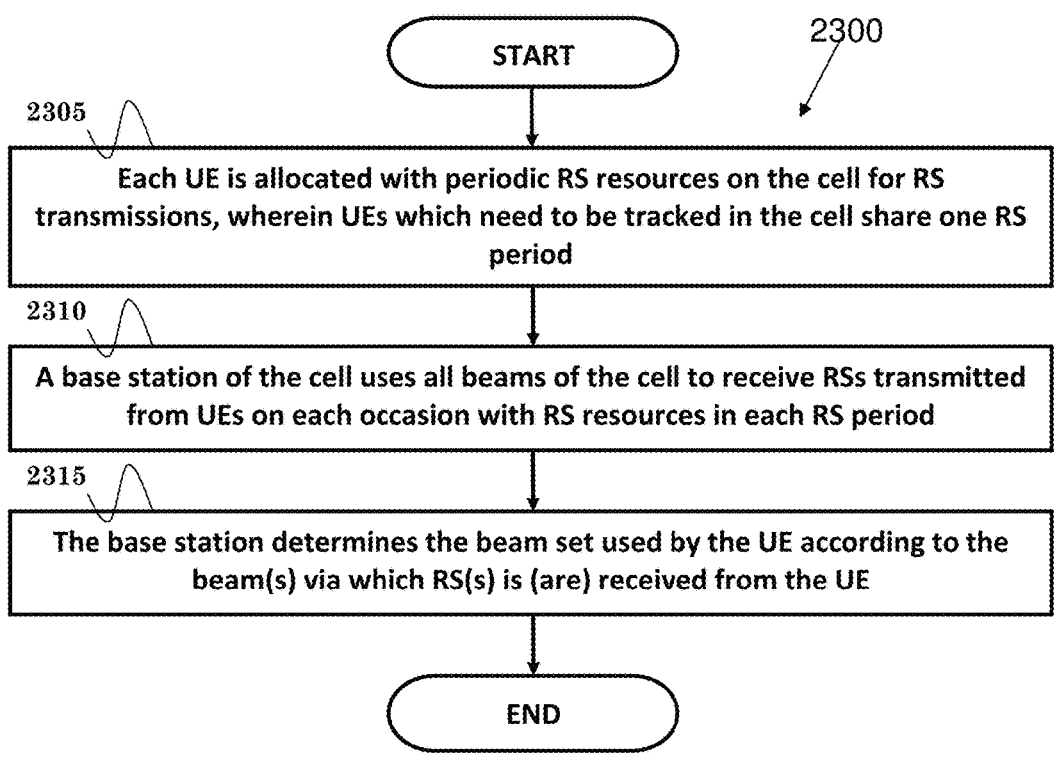
FIG. 23 is a flow chart according to one exemplary embodiment.

FIG. 23 is a flow chart 2300, in accordance with one exemplary embodiment, outlining a method for determining beam sets used by UEs in a cell of a wireless system, wherein each UE has its own beam set and there are multiple beams in the cell. In general, the method outlined in the flow chart 2300 could be applied by a base station in a centralized setting and to the same RS period for all UEs.

In step 2305, each UE is allocated with periodic RS resources on the cell for RS transmissions, wherein UEs which need to be tracked in the cell share one RS period. In step 2310, a base station of the cell uses all beams of the cell to receive RSs transmitted from UEs on each occasion with RS resources in each RS period. In one embodiment, the RS resources in each RS period for UEs which need to be tracked are located in one subframe. Furthermore, there is at least one occasion with RS resources in each RS period.

In step 2315, the base station determines the beam set used by the UE according to the beam(s) via which RS(s) is (are) received from the UE. In one embodiment, the base station could transmit a message to allocate the RS resources to the UE (for single connectivity). Furthermore, a second base station of a second cell serving the UE could transmit a message to allocate the RS resources to the UE (for dual connectivity).

In one embodiment, the beam set used by a UE contains at least one beam. In addition, the RSs are dedicated to the UE, which means the RSs of the UE are distinguishable from RSs of other UEs in the cell in at least one of following domains: time domain, frequency domain, and sequence domain.

In one embodiment, an occasion refers to a time unit e.g. a symbol, a time slot, or a subframe. Furthermore, each occasion of a RS period could be shared by all UEs which need to be tracked. In addition, different occasions of the RS period could be occupied by different UEs.

Referring back to FIGS. 3 and 4, in one embodiment from the perspective of a base station, the device 300 includes a program code 312 stored in memory 310 of the transmitter. The CPU 308 could execute program code 312 (i) to allocate each UE with periodic RS resources on the cell for RS transmissions, wherein UEs which need to be tracked in the cell share one RS period, and (ii) to enable a base station of the cell to use all beams of the cell to receive RSs transmitted from UEs on each occasion with RS resources in each RS period.

In one embodiment, the CPU 308 could further execute program code 312 to enable the base station to determine the beam set used by the UE according to the beam(s) via which RS(s) is (are) received from the UE. In addition, the CPU 308 can execute the program code 312 to perform all of the above-described actions and steps or others described herein.

Figure 24:
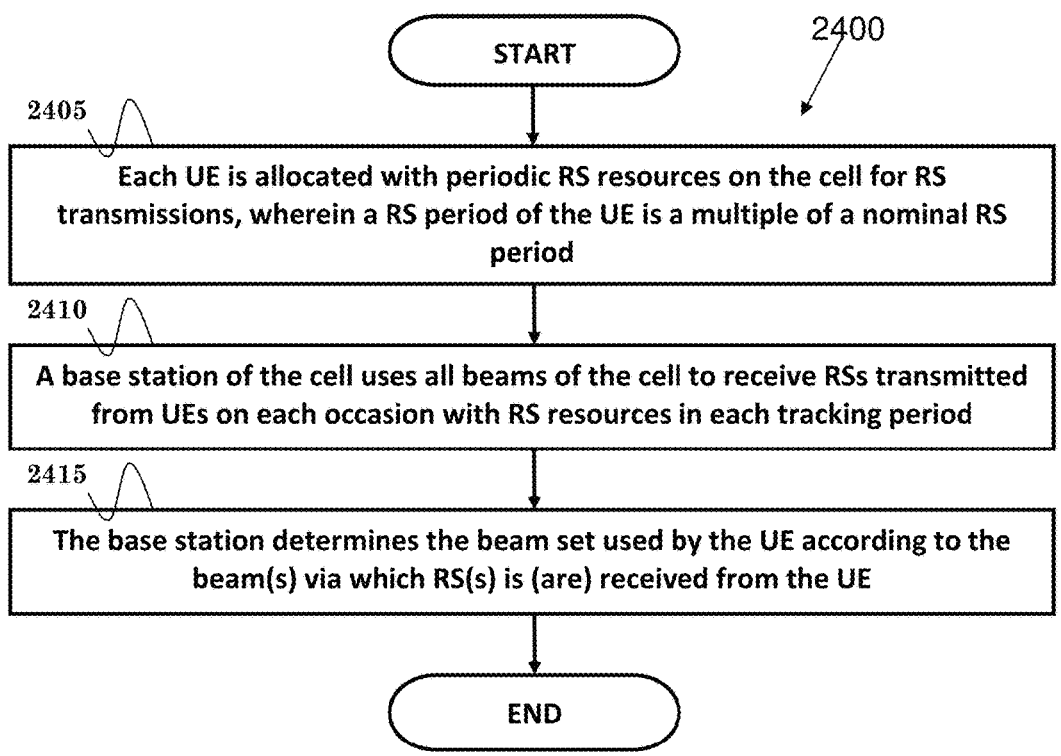
FIG. 24 is a flow chart according to one exemplary embodiment.

FIG. 24 is a flow chart 2400, in accordance with one exemplary embodiment, outlining a method for determining beam sets used by UEs in a cell of a wireless system, wherein each UE has its own beam set and there are multiple beams in the cell. In general, the method outlined in the flow chart 2400 could be applied by a base station in a centralized setting and to a UE-specific RS period.

In step 2405, each UE is allocated with periodic RS resources on the cell for RS transmissions, wherein a RS period of the UE is a multiple of a nominal RS period. In step 2410, a base station of the cell uses all beams of the cell to receive RSs transmitted from UEs on each occasion with RS resources in each tracking period.

In one embodiment, the RS resources in each tracking period for UEs which need to be tracked are located in one subframe. Furthermore, there is at least one occasion with RS resources in each tracking period.

In one embodiment, the tracking period is determined according to the RS periods of UEs which need to be tracked in the cell. Furthermore, the tracking period is a multiple of the nominal RS period. In addition, the tracking period is equal to the nominal RS period.

In step 2415, the base station determines the beam set used by the UE according to the beam(s) via which RS(s) is (are) received from the UE. In one embodiment, the base station could transmit a message to allocate the RS resources to the UE (for single connectivity). Furthermore, a second base station of a second cell serving the UE could transmit a message to allocate the RS resources to the UE (for dual connectivity).

In one embodiment, the beam set used by a UE contains at least one beam. In addition, the RSs are dedicated to the UE, which means the RSs of the UE are distinguishable from RSs of other UEs in the cell in at least one of following domains: time domain, frequency domain, and sequence domain.

In one embodiment, an occasion refers to a time unit e.g. a symbol, a time slot, or a subframe. Furthermore, each occasion of a RS period could be shared by all UEs which need to be tracked. In addition, different occasions of the RS period could be occupied by different UEs.

Referring back to FIGS. 3 and 4, in one embodiment from the perspective of a base station, the device 300 includes a program code 312 stored in memory 310 of the transmitter. The CPU 308 could execute program code 312 (i) to allocate each UE with periodic RS resources on the cell for RS transmissions, wherein a RS period of the UE is a multiple of a nominal RS period, and (ii) to enable a base station of the cell to use all beams of the cell to receive RSs transmitted from UEs on each occasion with RS resources in each tracking period.

In one embodiment, the CPU 308 could further execute program code 312 to enable the base station to determine the beam set used by the UE according to the beam(s) via which RS(s) is (are) received from the UE. In addition, the CPU 308 can execute the program code 312 to perform all of the above-described actions and steps or others described herein.

Figure 25:
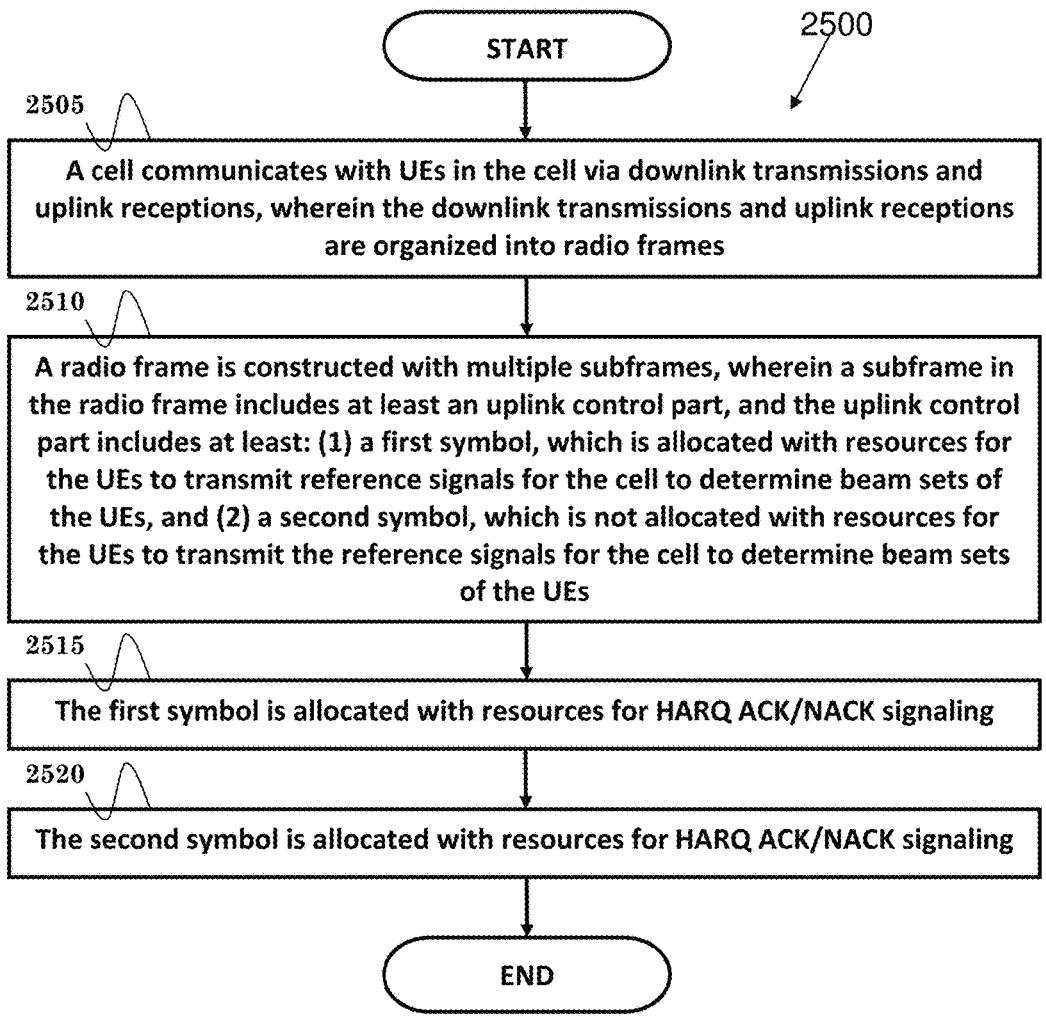
FIG. 25 is a flow chart according to one exemplary embodiment.

FIG. 25 is a flow chart 2500, in accordance with one exemplary embodiment, outlining a method for defining a subframe structure for beam detection. In step 2505, a cell communicates with UEs in the cell via downlink transmissions and uplink receptions, wherein the downlink transmissions and uplink receptions are organized into radio frames. In step 2510, a radio frame is constructed with multiple subframes, wherein a subframe in the radio frame includes at least an uplink control part, and the uplink control part includes at least: (1) a first symbol, which is allocated with resources for the UEs to transmit reference signals for the cell to determine beam sets of the UEs, and (2) a second symbol, which is not allocated with resources for the UEs to transmit the reference signals for the cell to determine beam set of the UEs.

In one embodiment, a first symbol is allocated with resources for HARQ ACK/NACK (Hybrid Automatic Repeat Request Acknowledgement/Negative Acknowledgement) signaling in step 2515. Furthermore, a second symbol is allocated with resources for HARQ ACK/NACK signaling in step 2520.

Referring back to FIGS. 3 and 4, in one embodiment from the perspective of a cell, the device 300 includes a program code 312 stored in memory 310 of the transmitter. The CPU 308 could execute program code 312 (i) to enable a cell to communicate with UEs via downlink transmissions and uplink receptions, wherein the downlink transmissions and uplink receptions are organized into radio frames, and (ii) to construct a radio frame with multiple subframes, wherein a subframe in the radio frame includes at least an uplink control part, and the uplink control part includes at least: (1) a first symbol, which is allocated with resources for the UEs to transmit reference signals for the cell to determine beam sets of the UEs, and (2) a second symbol, which is not allocated with resources for the UEs to transmit the reference signals for the cell to determine beam sets of the UEs.

In one embodiment, the CPU 308 could further execute program code 312 to allocate the first symbol and the second symbol with resources for HARQ ACK/NACK signaling. In addition, the CPU 308 can execute the program code 312 to perform all of the above-described actions and steps or others described herein.

Figure 26:
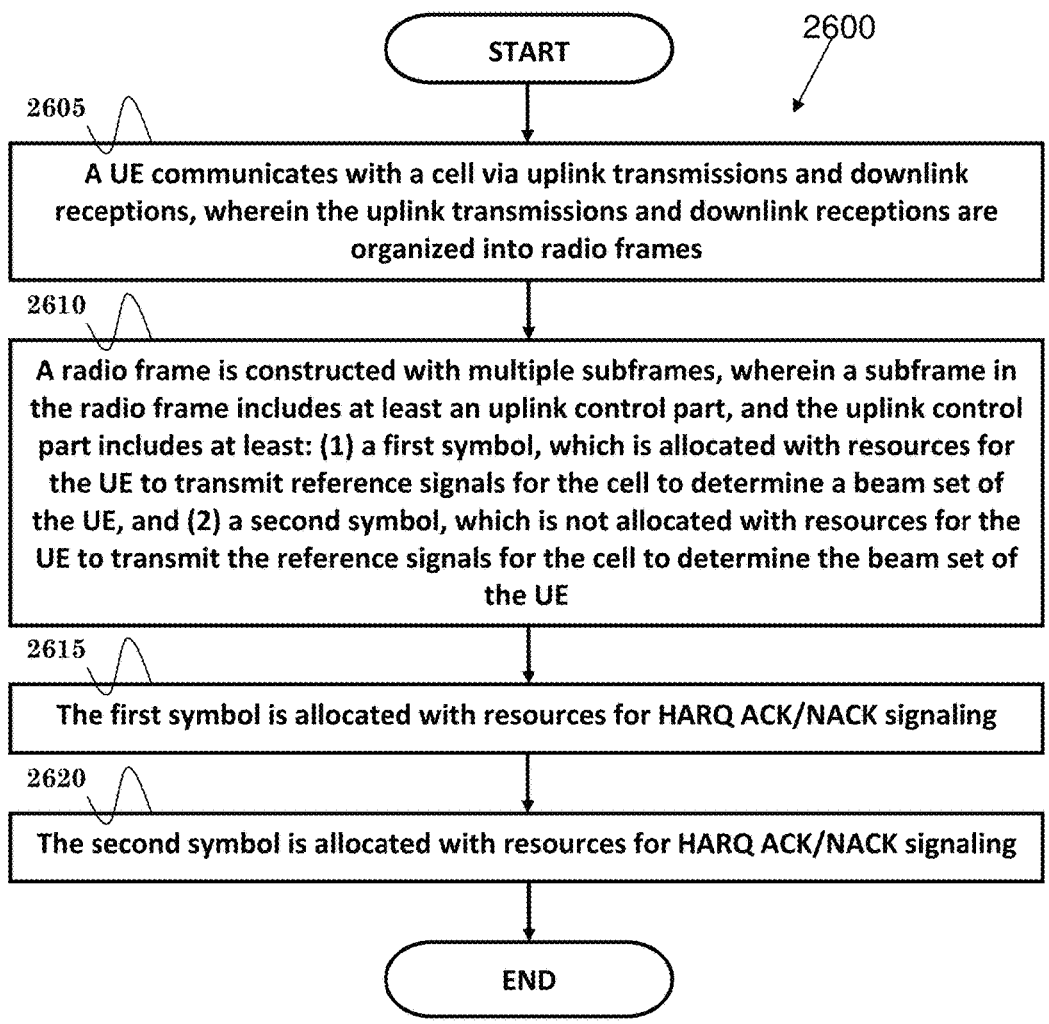
FIG. 26 is a flow chart according to one exemplary embodiment.

FIG. 26 is a flow chart 2600, in accordance with one exemplary embodiment, outlining a method for defining a subframe structure for beam detection. In step 2605, a UE communicates with a cell via uplink transmissions and downlink receptions, wherein the uplink transmissions and downlink receptions are organized into radio frames. In step 2610, a radio frame is constructed with multiple subframes, wherein a subframe in the radio frame includes at least an uplink control part, and the uplink control part includes at least: (1) a first symbol, which is allocated with resources for the UE to transmit reference signals for the cell to determine a beam set of the UE, and (2) a second symbol, which is not allocated with resources for the UE to transmit the reference signals for the cell to determine the beam set of the UE.

In one embodiment, a first symbol is allocated with resources for HARQ ACK/NACK signaling in step 2615. Furthermore, a second symbol is allocated with resources for HARQ ACK/NACK signaling in step 2520.

Referring back to FIGS. 3 and 4, in one embodiment from the perspective of a UE, the device 300 includes a program code 312 stored in memory 310 of the transmitter. The CPU 308 could execute program code 312 (i) to enable a UE to communicate with a cell via uplink transmissions and downlink receptions, wherein the uplink transmissions and downlink receptions are organized into radio frames, and (ii) to construct a radio frame with multiple subframes, wherein a subframe in the radio frame includes at least an uplink control part, and the uplink control part includes at least: (1) a first symbol, which is allocated with resources for the UE to transmit reference signals for the cell to determine a beam set of the UE, and (2) a second symbol, which is not allocated with resources for the UE to transmit the reference signals for the cell to determine the beam set of the UE.

In one embodiment, the CPU 308 could further execute program code 312 to allocate the first symbol and the second symbol with resources for HARQ ACK/NACK signaling. In addition, the CPU 308 can execute the program code 312 to perform all of the above-described actions and steps or others described herein.

With respect to the methods outlined in FIGS. 25 and 26, in one embodiment, the subframe in the radio frame could contain a downlink control part and/or a data part. Furthermore, the subframe structure could be used in a TDD (Time Division Duplex) mode.

In one embodiment, the downlink transmissions and uplink receptions relevant to the UE could be performed by the cell on multiple beams in a beam set of the UE. Furthermore, a total number of beams in the cell could be fixed. In addition, the direction and/or the width of each beam in the cell could be fixed.

In one embodiment, there is a period associated with transmissions of the reference signals and there are multiple resources for reference signal transmissions at different occasions (or timings) in each period.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for determining a beam set used by a user equipment (UE) in a cell of a wireless communication system, wherein there are multiple beams in the cell, comprising:
   a base station of the cell determines an initial beam set of the UE via a contention based random access procedure;
   the base station of the cell transmits a message indicating reference signal (RS) resources on a cell to the UE after the initial beam set of the UE has been determined, wherein the RS resources define periodic resources for RS transmissions, and
   wherein there are multiple contiguous symbols with resources for transmissions of multiple RSs by the UE in each RS period, and a length of each RS period is greater than a length of the multiple contiguous symbols with resources for transmissions of multiple RSs by the UE in each RS period; and
   the base station of the cell uses at least one beam to receive a RS transmitted from the UE on each symbol of the multiple contiguous symbols in each RS period.

2. The method of claim 1, further comprising:
   the base station uses different sets of beams to receive RSs transmitted from the UE on different symbols in the RS period.

3. The method of claim 1, wherein the total beams used to receive RSs transmitted from the UE in the RS period cover all beams of the cell.

4. The method of claim 1, wherein the multiple contiguous symbols with resources for RS transmissions are UE specific.

5. The method of claim 1, wherein the RSs are dedicated to the UE.

6. The method of claim 5, wherein the RSs dedicated to the UE means the RSs of the UE are distinguishable from RSs of other UEs in the cell in at least one of following domains: time domain, frequency domain, and sequence domain.

7. A method for reference signal (RS) transmissions by a user equipment (UE) in a cell of a wireless communication system, comprising:
   the UE performs a contention based random access procedure for a base station of the cell to determine an initial beam set of the UE;
   the UE receives a message indicating RS resources on a cell after the initial beam set of the UE has been determined by the base station of the cell,
   wherein the RS resources define periodic resources for RS transmissions, and
   wherein there are multiple contiguous symbols with resources for transmissions of multiple RSs by the UE in each RS period, and a length of each RS period is greater than a length of the multiple contiguous symbols with resources for transmissions of multiple RSs by the UE in each RS period; and
   the UE transmits multiple RSs on the multiple contiguous symbols in each RS period to the base station of the cell.

8. The method of claim 7, wherein the multiple contiguous symbols with resources for RS transmissions are UE specific.

9. The method of claim 7, wherein the RSs are dedicated to the UE.

10. method of claim 9, wherein the RSs dedicated to the UE means the RSs of the UE are distinguishable from RSs of other UEs in the cell in at least one of following domains: time domain, frequency domain, and sequence domain.

11. A user equipment (UE), comprising:
    a control circuit;
    a processor installed in the control circuit; and
    a memory installed in the control circuit and coupled to the processor;
    wherein the processor is configured to execute a program code stored in the memory to:
    perform a contention based random access procedure for a base station of the cell to determine an initial beam set of the UE;

receive a message indicating reference signal (RS) resources on a cell after the initial beam set of the UE has been determined by the base station of the cell, wherein the RS resources define periodic resources for RS transmissions, and wherein there are multiple contiguous symbols with resources for transmissions of multiple RSs by the UE in each RS period, and a length of each RS period is greater than a length of the multiple contiguous symbols with resources for transmissions of multiple RSs by the UE in each RS period; and transmit multiple RSs on the multiple contiguous symbols in each RS period to the base station of the cell.

12. The UE of claim 11, wherein the multiple contiguous symbols with resources for RS transmissions are UE specific.

13. The UE of claim 11, wherein the RSs are dedicated to the UE.

14. The UE of claim 13, wherein the RSs dedicated to the UE means the RSs of the UE are distinguishable from RSs of other UEs in the cell in at least one of following domains: time domain, frequency domain, and sequence domain.

15. The method of claim 1, wherein there are at least 3 periods of RS resources for RS transmissions.

16. The method of claim 7, wherein there are at least 3 periods of RS resources for RS transmissions.

17. The UE of claim 11, wherein there are at least 3 periods of RS resources for RS transmissions.

* * * * *